United States Patent [19]

Tesoro et al.

[11] Patent Number: 4,882,399
[45] Date of Patent: Nov. 21, 1989

[54] EPOXY RESINS HAVING REVERSIBLE CROSSLINKS

[75] Inventors: Giuliana C. Tesoro, Dobbs Ferry; Vinod R. Sastri, Brooklyn, both of N.Y.

[73] Assignee: Polytechnic University, Brooklyn, N.Y.

[21] Appl. No.: 88,179

[22] Filed: Aug. 21, 1987

[51] Int. Cl.$^4$ .............................................. C08G 59/50
[52] U.S. Cl. ...................................... 525/523; 528/73; 528/109; 528/365; 528/373; 525/523; 525/528; 525/530; 525/533
[58] Field of Search ................ 528/109, 73, 365, 373, 528/; 525/523, 528, 530, 533

[56] References Cited

U.S. PATENT DOCUMENTS

| | | | |
|---|---|---|---|
| 2,789,958 | 4/1957 | Fettes et al. | 528/109 |
| 2,849,416 | 8/1958 | Bender et al. | 528/109 X |
| 2,871,217 | 1/1959 | Howard | 528/109 X |
| 3,335,201 | 8/1967 | Bertozzi | 528/109 X |
| 3,350,423 | 10/1967 | Carlyle | 528/109 X |
| 4,214,067 | 7/1980 | Packer | 528/109 X |

Primary Examiner—Earl Nielsen
Attorney, Agent, or Firm—Curtis, Morris & Safford

[57] ABSTRACT

A method for the preparation of insoluble, infusible epoxy resins containing reversible crosslinks comprising the steps of:

(a) forming a reaction mixture of
 (i) an epoxy compound having two or more epoxy groups, and
 (ii) a crosslinking agent containing two or more epoxy-reactive groups and further containing a disulfide bond, said crosslinking agent being selected from compounds having the formula

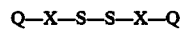

where Q is an epoxy-reactive functional group selected from

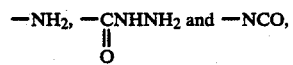

and X is a divalent aromatic or aliphatic hydrocarbon radical of one to ten carbon atoms, and (b) curing said reaction mixture under conditions conductive to the formation of a crosslinked resin.

The epoxy resin can be solubilized by cleavage of the disulfide bond by reduction in the presence of a solvent. The resultant thiol groups can be reoxidized to form the disulfide linkages or can be modified by other reactions.

56 Claims, 20 Drawing Sheets

EPOXY RESINS HAVING REVERSIBLE CROSSLINKS

This invention relates to methods for crosslinking resins and to the crosslinked resins obtained. More specifically, this invention relates to methods for curing known difunctional or trifunctional epoxy resins with difunctional or multifunctional crosslinking agents, to methods for cleaving crosslinks in the cured resin at a labile bond to form a soluble polymer, and to methods for reoxidizing the reduced soluble polymer to make new cured resins or to modify the reduced polymer to make resins having a variety of properties. Even more specifically, this invention relates to methods for recovering epoxy resins, in which reversible crosslinks are present, from finished articles of manufacture.

Epoxy resins have been used extensively in commerce to prepare hard thermoset solid polymeric compounds. Their use is widespread in many industries, notably, the electrical and aerospace industries. They are used, for example, in protective coatings, coatings, adhesives, structural composites, and laminates.

BACKGROUND OF THE INVENTION

Typically, epoxy resins are converted from a liquid or thermoplastic state to thermoset solids by reactions involving the use of reactive compounds, or curing agents, which become a part of the crosslinked structure. Curing agents can be selected from a large number of reactive chemical structures but in practice a limited number of compounds are used in industry. The compounds most often used belong to one of the following six groups:

(1) aliphatic amines;
(2) polyamines;
(3) amine terminated polyamides;
(4) aromatic amines;
(5) anhydrides of dicarboxylic acids; and
(6) condensation products of formaldehyde with phenols or amides.

The reaction of diepoxides with diamines and polyamines is of primary commercial importance. Following is a schematic summary of the major reactions in the amine curing of epoxides.

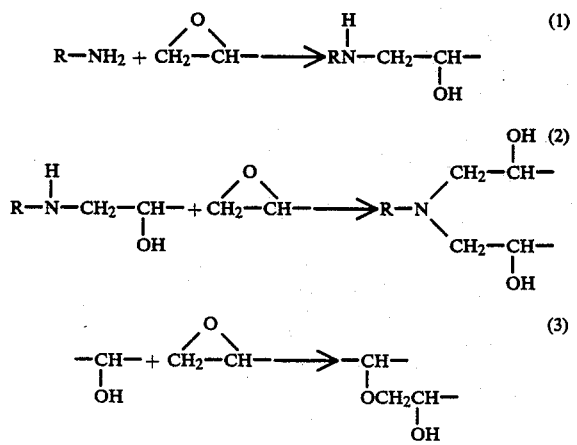

The chemical reactions shown above compete for the epoxide groups in the system, their relative rates depending on the relative reactivities of specific reagents and intermediates. Reactions (1) and (2) predominate, the reactivity of the primary and secondary amine hydrogens depending on both induction and steric effects.

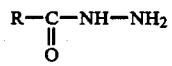

are "amine terminated amides," the amine functionality being directly attached to the amide groups. As a result, the reactivity of these "amine" hydrogens is greatly affected by the strong inductive effect of the amide carbonyl. Hydrazides are easily synthesized from carboxylic acid esters and hydrazine hydrate.

Dihydrazides, like amines, can be used as curing agents in epoxide resin systems. Kamon and Saito, Kobunshi Ronbunshi 37, 765 (1980), Shikizai Kyokaishi 54, 416 (1981), and Kobunshi Kako 31, 10 (1982), have studied aliphatic carboxylic acid dihydrazides $NH_2HNCO(CH_2)_nCONHNH_2$ (n=2 to 18) as curing agents for epoxy resins. They found that the pot lives of these resin systems were much longer as compared to those in which aliphatic diamines were used, and that the curing mechanism of the terminal (primary) hydrogens of the hydrazides was similar to that observed for amines. The polar nature of the hydrazide bonds resulted in higher glass transition temperatures ($T_g$) in the cured resins than in the case of aliphatic diamines.

Attempts have been made in the art to reuse crosslinked resins, but such attempts have not been successful. For example, epoxy resins have been converted to powders by pulverization or other mechanical means, and mixed with virgin resin for reuse in products of less demanding properties.

The art has heretofore failed to provide a method for crosslinking epoxy resins with a crosslinking or curing agent which can subsequently be cleaved and then, if desired, reformed, without significant sacrifice of the resin properties. Practically speaking, the commercial resins cannot be recovered and the constituents thereof, including structural fillers and the like, cannot be reused in new or modified resin structures.

It is the primary objective of this invention to convert cured epoxy resins to a polymeric material which can be reprocessed and crosslinked anew without impairing or significantly altering its properties.

It is a related purpose of this invention to provide curing compounds for epoxy resins which can be reversibly crosslinked without process inefficiency and without sacrificing the significant physical and chemical properties of the resin structure.

It is a further object of this invention to form cured epoxy resins wherein the crosslinks can be cleaved and reformed into useful new epoxy resins in an efficient and inexpensive manner.

It is a further object of this invention to form cured epoxy resins which can be reduced to a soluble form such that structured fillers (e.g., graphite fiber) can be efficiently removed from the resin for reuse.

It is still a further and significant object of this invention to employ curing agents which can react with the terminal epoxy groups of the resin to form the crosslinked network, which can subsequently be cleaved at a labile bond under mild reduction conditions and which can thereafter be modified into a variety of useful polymers.

It is still a further and related object of this invention to use crosslinking agents which are not expensive or difficult to produce and whose ability to be cleaved and reformed or cleaved and modified is such that the crosslinked resins can be efficiently recovered for reuse.

These and other objectives can be realized by curing epoxy resin precursors—material containing two or more epoxy groups (e.g.,

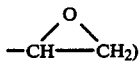

—with bifunctional or polyfunctional crosslinking agents which contain a disulfide bond (—S—S—) in addition to the required epoxy-reactive groups (e.g., —NH$_2$).

Examples of such crosslinking agents are:
H$_2$NNH—CO CH$_2$CH$_2$—S—S—CH$_2$ CH$_2$ CO—NH NH$_2$—(aliphatic) dithiodihydrazide
H$_2$NNH COC$_6$H$_4$—S—S—C$_6$H$_4$—CO NH NH$_2$—(aromatic) dithiodihydrazide (o,o')
H$_2$N—C$_6$H$_4$—S—S—C$_6$H$_4$NH$_2$—Dithiodiamine (p,p')

The disulfide bonds in the cured resins can then be reduced and reoxidized in the following reactions.

Typical Reactions

R—S—S—R $\xrightarrow{[H]}$ 2 RSH    Equation (1)

2 RSH $\xrightarrow{[O]}$ R—S—S—R    Equation (2)

2 RSH + X[R']X $\longrightarrow$ R—S—[R']—S—R    Equation (3)
(R' = divalent radical; X = halogen)

The preferred crosslinking agents of the invention are the dihydrazides of dithiodicarboxylic acids (aliphatic and aromatic) and aromatic dithiodiamines (e.g., dithiodianiline). Either dihydrazides of aliphatic dithiodicarboxylic acids or aromatic dithiodiamines may be used.

The disulfide linkages in the curing agents of the invention can be reduced to mercaptan by many reducing agents such as zinc and dilute acid, alkali, trialkyl- and lithium aluminum hydride, by methods known in the art (L. B. Ryland, M. W. Tamele, "The Analytical Chemistry of Sulfur and its Compounds," Part I, J. H. Karchmer ed., Wiley-Interscience, 1970, p. 465; J. Wardell, "The Chemistry of the Thiol Group," Part II, S. Patai Ed., Wiley-Interscience, N.Y., (1976, p. 220)). In particular, tributyl phosphine has been used effectively in the reduction of cystine residues in wool (B. J. Sweetman, J. A. McClaren, Aust. J. Chem. 19, 2346 (1966)). Overman and coworkers found that triphenyl phosphine in aqueous dioxane efficiently reduced aryl disulfides (L. Overman, J. Smoot, J. D. Overman, Synthesis 59 (1974); L. Overman, D. Matzinger, E. M. O'Connor, J. D. Overman, J. Amer. Chem. Soc. 96, 6081 (1974).

Sakamoto et al. (M. Sakamoto, J. Takeda, Y. Yamada, H. Tonami, J. Appl. Polym. Sci. 14, 865 (1970)) have used triphenyl phosphine to cleave disulfide linkages in the product formed by the crosslinking reaction of dithiodihydrazides with cotton fabric.

It has now been found that these reduction reactions are effective for cleaving disulfide linkages in dithiodihydrazide-cured and dithiodiamine-cured epoxy resins, thereby regenerating soluble, thiol-containing polymer from the crosslinked thermoset. The selection of solvent to swell the crosslinked polymer sufficiently is critical for penetration of the reducing agents and reaction times and/or temperatures have been determined for specific cured systems. The reduction degradation reaction of a dithiodihydrazide cured epoxy resin to a soluble, recoverable system is shown schematically below.

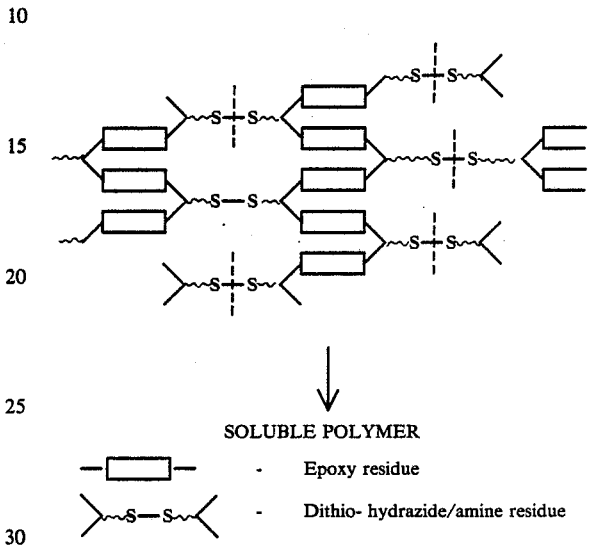

SOLUBLE POLYMER

  -  Epoxy residue

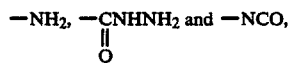  -  Dithio- hydrazide/amine residue

STATEMENT OF THE INVENTION

Broadly, the invention is in a method for the preparation of epoxy resins cured with a crosslinking agent which can be cleaved at a labile bond comprising the steps of:

(a) forming a reaction mixture of (i) an epoxy compound having two or more epoxy groups, and (ii) a crosslinking agent containing two or more epoxy-reactive groups and further containing a disulfide bond, and (b) curing said reaction mixture under conditions conductive to the formation of a crosslinked resin. Desirably, the crosslinking agent is selected from compounds having the formula

Q—X—S—S—X—Q where Q is an epoxy-reactive functional group selected from

—NH$_2$, —$\underset{\underset{O}{\|}}{C}$NHNH$_2$ and —NCO, and X is a divalent aromatic or aliphatic hydrocarbon radical of one to ten carbon atoms.

Alternatively, the crosslinking agent may be selected from compounds of the formula

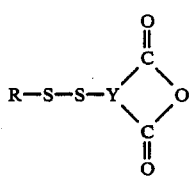

where Y is a substituted or unsubstituted hydrocarbon radical which may be alicyclic or aromatic and R is an aliphatic, alicyclic, or aromatic hydrocarbon radical, or

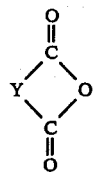

Preferably, the epoxy compound is made from bisphenol A and epichlorohydrin and has the formula

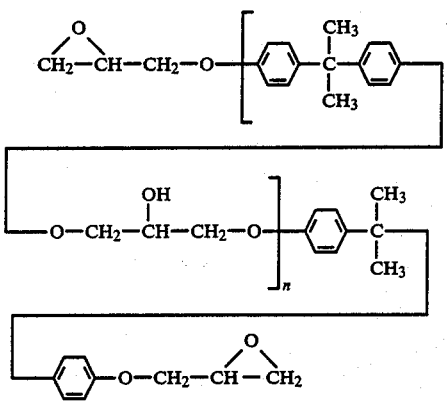

where n is a number from 0 to 20. Typically, n is a number from 0.2 to 10. Such compounds are available commercially, for example, from Shell Chemical Co. under the trade name Epon.

The epoxy resin may also contain 3 or 4 epoxy groups. For example, the following compounds may be used.

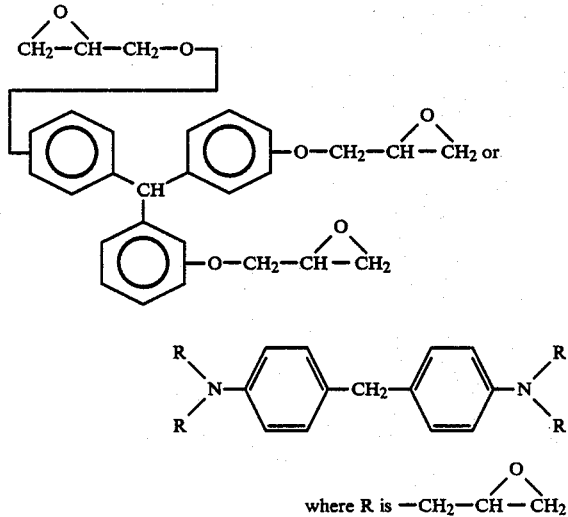

Multifunctional epoxy resins are, for example, those offered commercially by Shell under the name Epon HPT 1071 and 1072.

The preferred crosslinkers of the invention are 3,3'-dithiopropionyl dihydrazide (DTPDH)

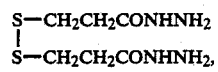

2,2'-dithiobenzoic acid dihydrazide (DTBDH)

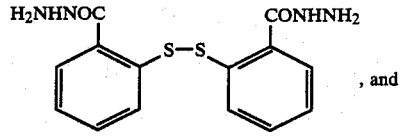, and 4,4'-dithiodianiline (DTDA)

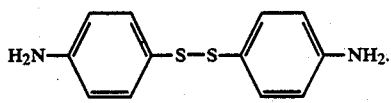

The temperature of the curing reactions ranges broadly from 25° to 200° C. and preferably is 70° to 180° C. From 2 to 48 hours are required for complete crosslinking.

The crosslinked resin may be solubilized by cleaving the disulfide bond by reducing the resin in the presence of a reducing agent selected from the group consisting of trialkyl and triaryl phosphine, alkali metal borohydride, alkali metal aluminum hydride and alkali metal trialkyl borohydride.

Desirably, the reducing agent is one that can provide a homogeneous reaction environment for said reduction cleavage. Best results have been obtained with tributyl phosphine. The temperature of the reduction step is broadly from 25° to 200° C. and preferably from 80° to 170° C.

It is essential to employ a solvent to swell the crosslinked resin so that the reducing agent can reach the disulfide bonds in the resin. The preferred solvents are inert, polar, organic compounds such as ether solvents of boiling point above 70° C. Suitable solvents are, for example, dioxane and ethylene glycol dimethyl ether (diglyme). Other solvents, such as dimethyl sulfoxide, dimethyl acetamide, and sulfolane may also be used. From 30 minutes to several hours may be required to solubilize the cured resin, depending upon the degree of crosslinking of the resin and the conditions used for reduction, including choice of solvent, reducing agent, temperature, and other factors.

The solubilization of the cured resin permits the efficient recovery by conventional means of any structural fillers or the like which have been used in the formation thereof. Such structural additives may have considerable value of their own and their recovery for potential reuse is an important aspect of the invention.

The disulfide bonds can be reformed, if desired, by oxidizing the cleaved mixture in the presence of an oxidizing agent selected from iodine, hydrogen peroxide, potassium iodide, air, and oxygen. The oxidation step takes place at 25° to 200° C. and typically from 1 to 24 hours are required.

As an alternative to reformation by oxidation, the soluble, thiol-containing polymer can be modified to alter the properties of the resin. Such modifications include (i) crosslinking with bis-maleimides of aromatic diamines or with other bifunctional activated vinyl crosslinking agents; or (ii) crosslinking with dihalides to form stable thioether linkages in the resin; or (iii) reacting, in base-catalyzed reactions, with diepoxides or virgin epoxy resins to optimize the properties of the polymer and obtain interpenetrating polymer networks (IPN); or (iv) grafting of rubber particles which can become covalently bound to the resin and impart enhanced toughness.

In The Drawings

Figure 13:
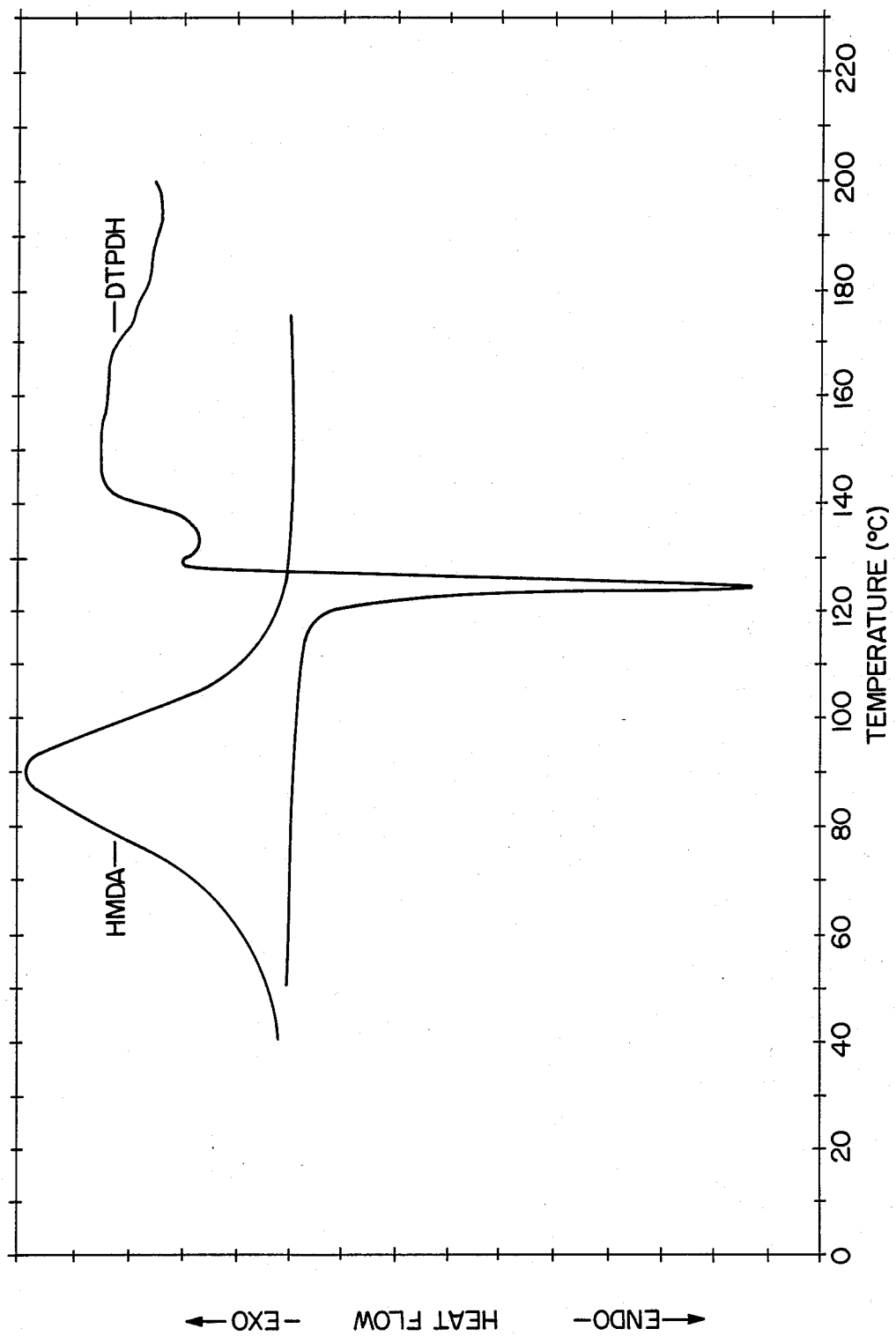

FIG. 13 plots DSC thermograms of HMDA and DTPDH with Epon 828 in a 1:2 molar ratio (curing agent/epoxide).

Figure 14:
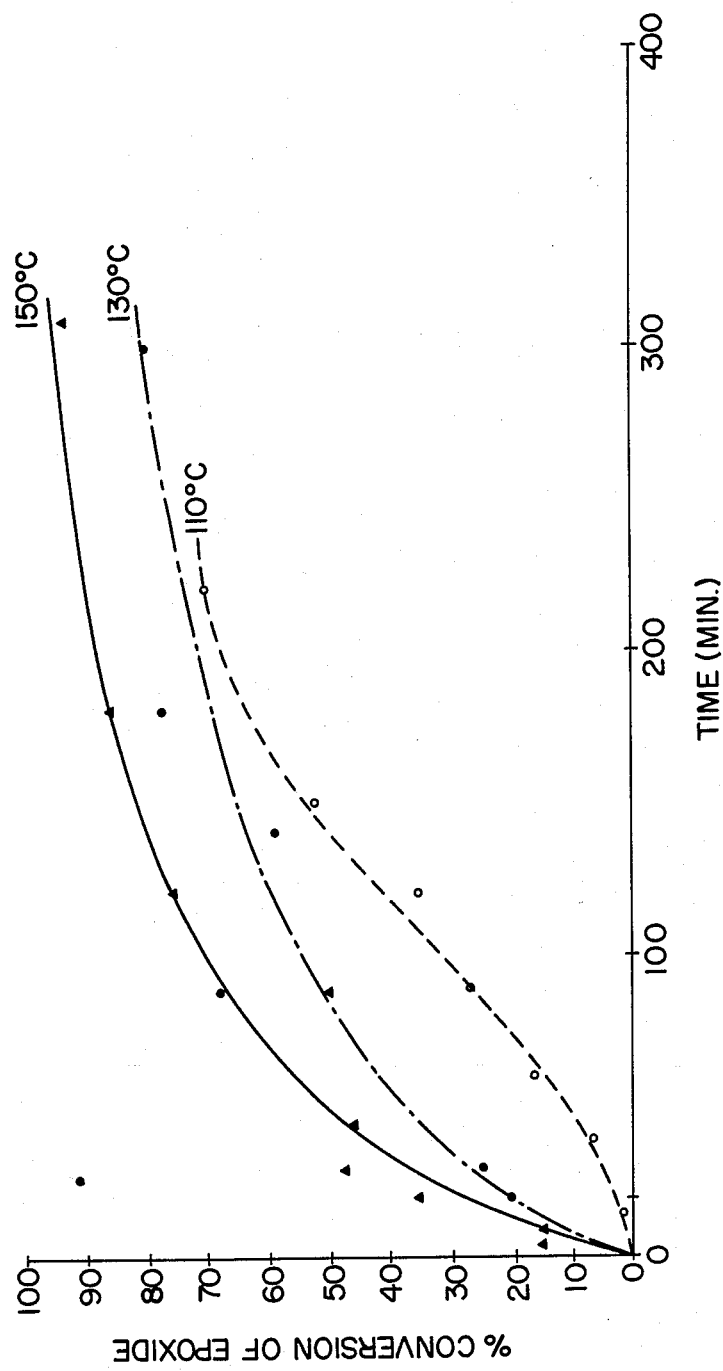

FIG. 14 is a plot of cure kinetics of DTPDH/Epon 828 in a 1:2 molar ratio (dihydrazide/epoxide).

Figure 15:
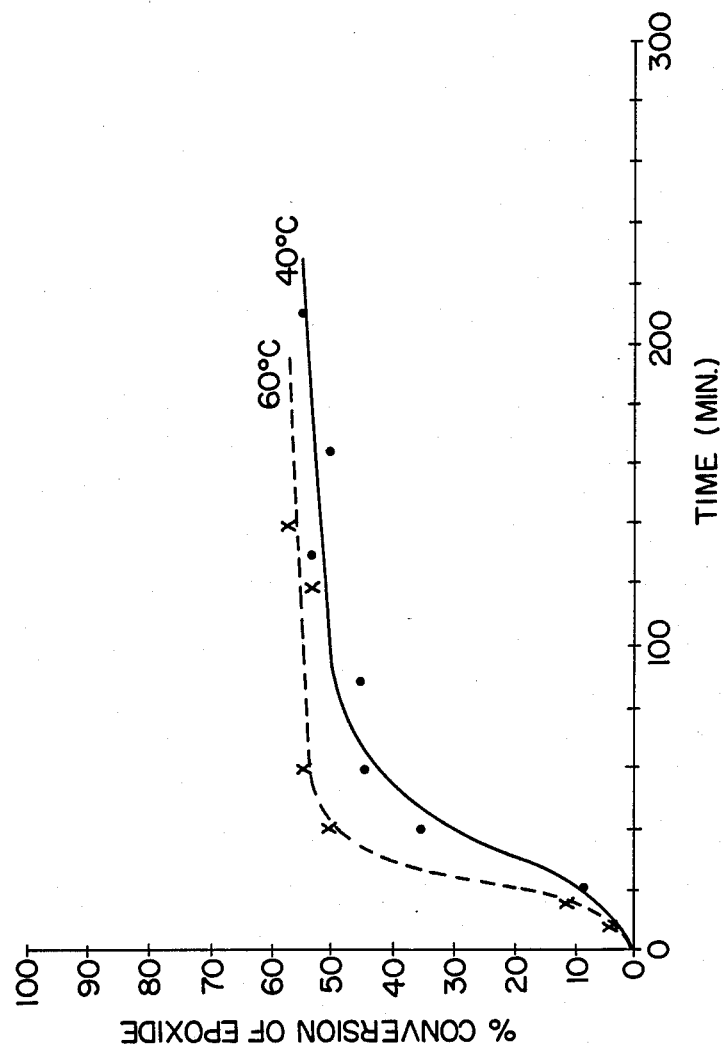

FIG. 15 is a plot of cure kinetics of HMDA/Epon 828 in a 1:2 molar ratio (amine/epoxide).

Figure 16:
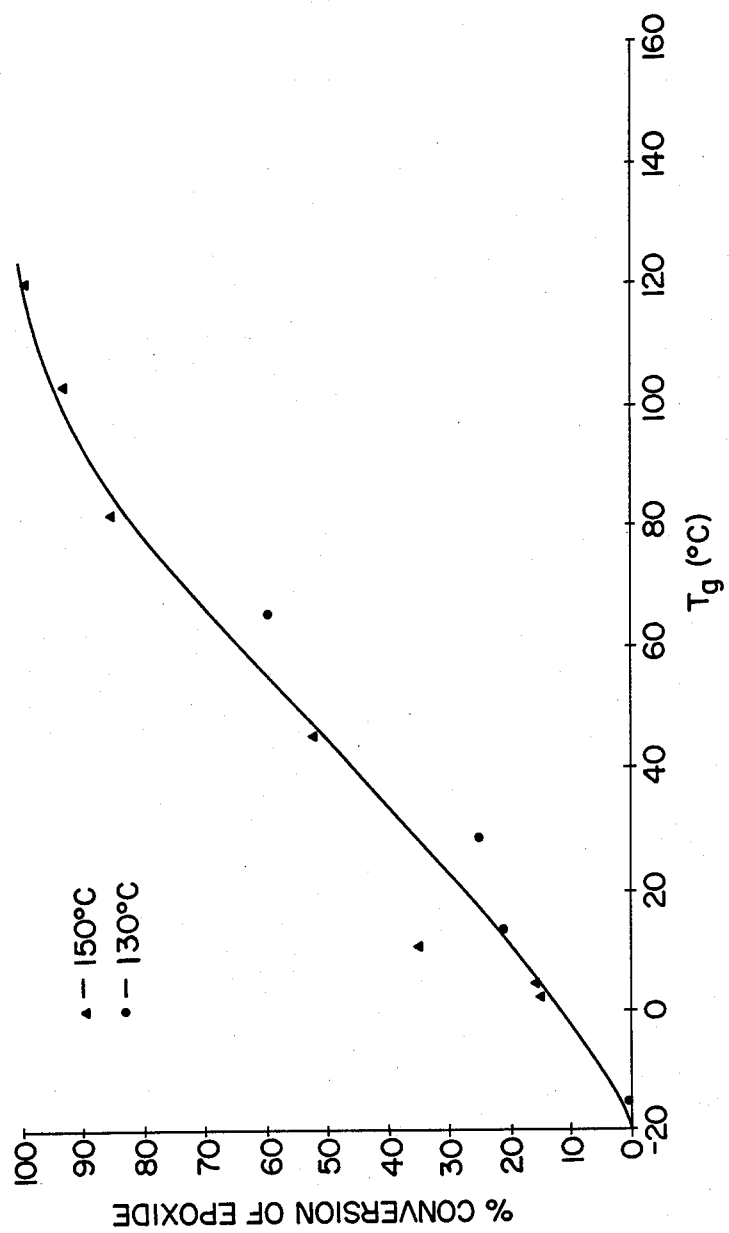

FIG. 16 is a plot of $T_g$ versus percent conversion of epoxide for DTPDH/Epon 828 in a 1:2 molar ratio (dihydrazide/epoxide).

Figure 17:
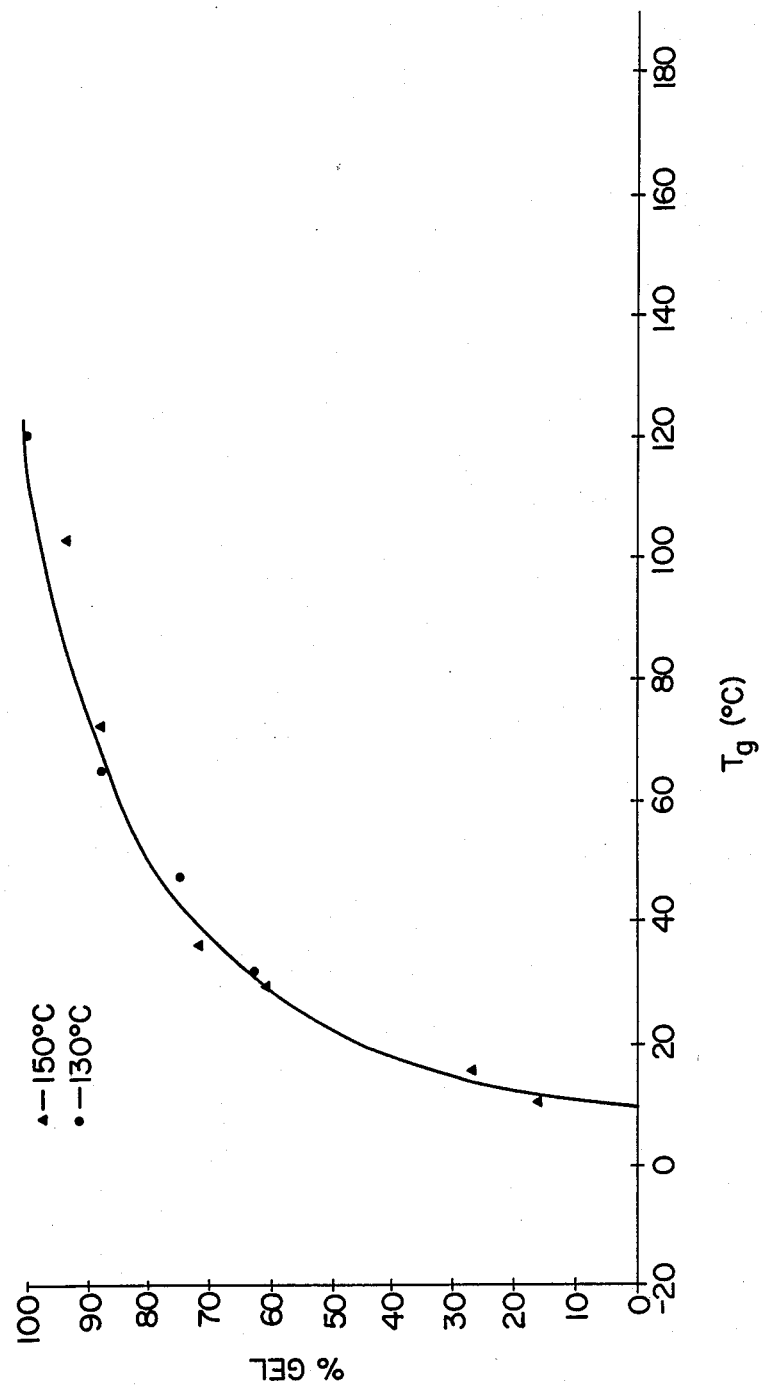

FIG. 17 is a plot of $T_g$ versus percent gel for DTPDH/Epon 828 (1:2).

Figure 18:
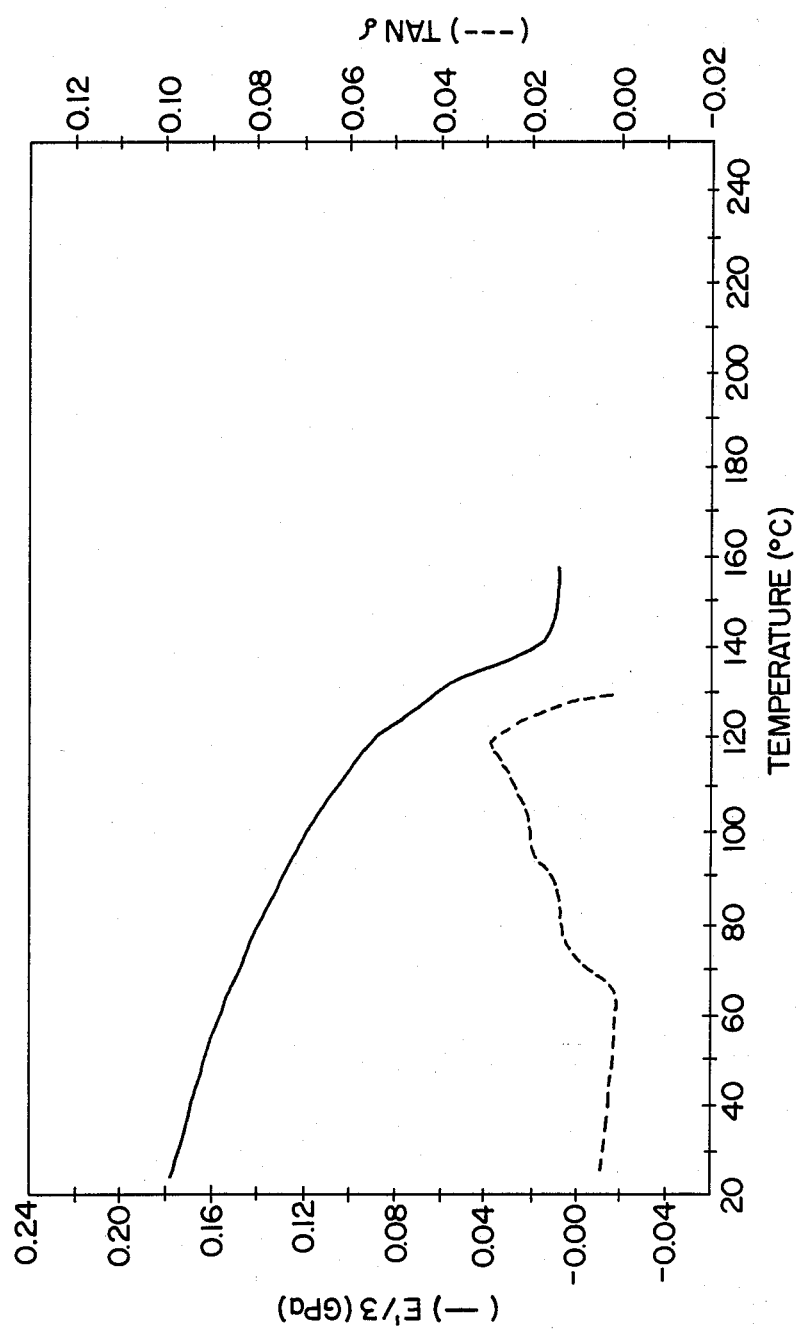

FIG. 18 is a DMA plot of DTPDH/Epon 828 (1:2).

Figure 19:
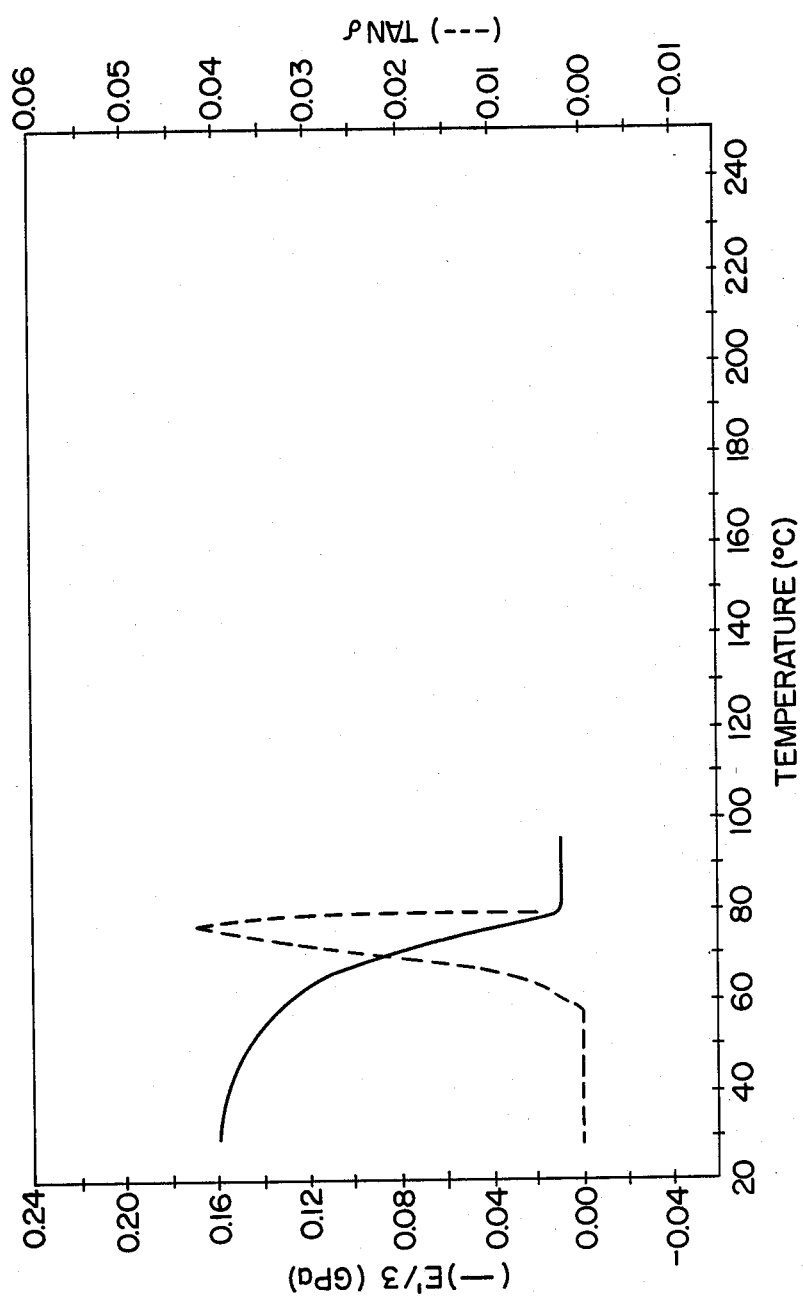

FIG. 19 is a DMA plot of HMDA/Epon 828 (1:2).

Figure 20:
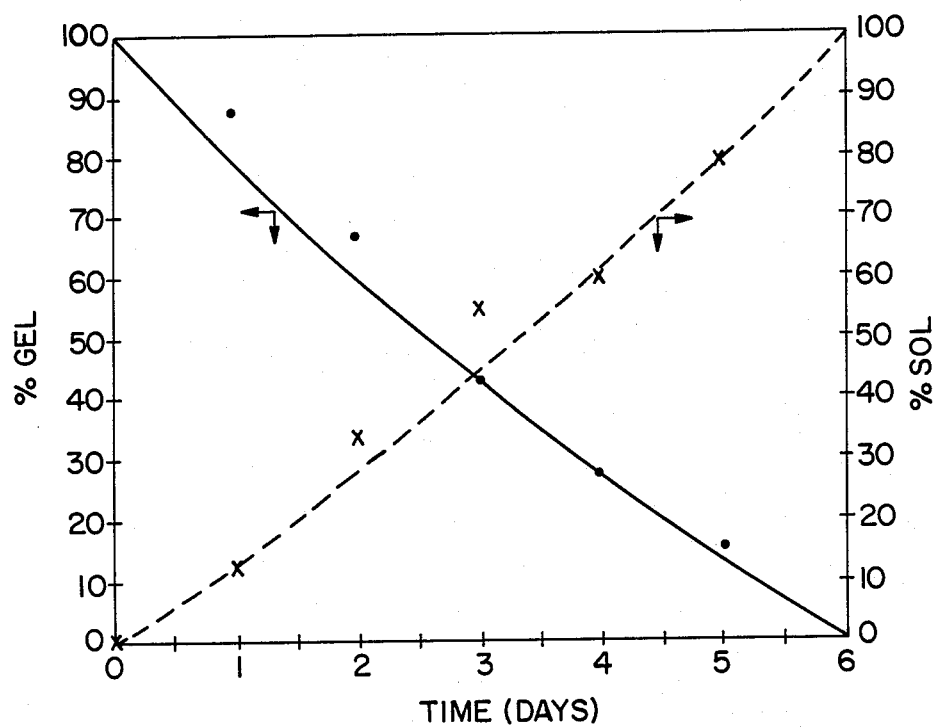

FIG. 20 is plot of percent of sol and gel in the reduction of fully cured DTPDH/Epon 828 (1:2) with time.

EXAMPLES

The invention is further described in the following examples.

A. Reactants
1. Epoxide compound
Diglycidyl ether of bisphenol A (resin) Epon 828[R]

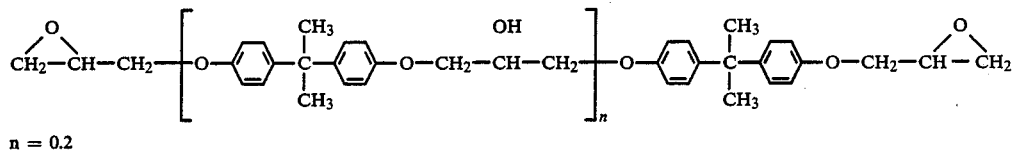

n = 0.2

2. Experimental Curing Agents
(a) 3,3'-Dithiopropionyl dihydrazide DTPDH

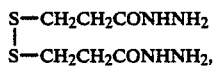

(b) 2,2'-Dithiobenzoic acid dihydrazide DTBDH

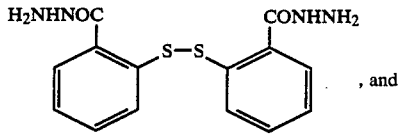

, and (c) 4,4'-Dithiodianiline DTDA

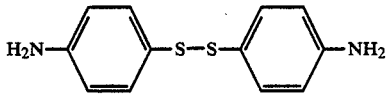

3. Reference Curing Agents
(a) Adipic acid dihydrazide ADH

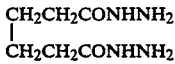

(b) Hexamethylene diamine HMDA

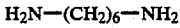

(c) Methylene dianiline MDA

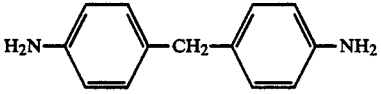

B. Sources of Epoxide, Curing Agents and Reduction Compounds
1. Materials
2,2'-Dithiopropionyldihydrazide (DTPDH) is synthesized as described below. Thionyl chloride (SOCl$_2$)—(Aldrich) was distilled before use. p,p'-Dithiodianiline (DTDA)—(Aldrich) was recrystallized from ethanol-water, and methylene dianiline (MDA)—(Aldrich) was recrystallized from water.

2,2'-Dithiobenzoic acid, hexamethylene diamine, triphenylphosphine (Ph$_3$P), tributylphosphine (Bu$_3$P) (all Aldrich), and Epon 828 (Polysciences) were used as received.

Methanol, dioxane and benzene were refluxed over sodium and distilled before use. All other solvents and chemicals were used as received.

The synthesis of 2,2'-dithiobenzoic acid dihydrazide (DTBDH) was carried out by the modified procedure of Katz et al., J. Org. Chem. 18, 1380 (1953).

a. Synthesis of dithiopropionyl dihydrazide (DTPDH)

To 30 grams of dithiopropionic acid in a 250 ml round bottomed flask was added 50 ml dry methanol and six drops of concentrated sulfuric acid. The solution was refluxed for 16 hours. Excess methanol was then removed in vacuo, and the residual product dissolved in benzene. The resulting solution was washed once each with water, dilute sodium carbonate, and water. The benzene solution was dried over anhydrous magnesium sulfate, filtered and the solvent removed under vacuum. The product was vacuum distilled (126°–130° C./0.2 mm Hg) to give 27.2 grams of dimethyl dithiopropionate.

To 20 grams of the diester, 15 ml of ethanol and 35 ml of hydrazine hydrate was added in a 250 ml round bottomed flask. The mixture was refluxed for 6 hours. The solution was then cooled and the crystals formed were filtered. The residue was recrystallized from ethanol to give 11.6 grams of pure dihydrazide with a melting point of 124°–126° C.

C. Instrumentation for Determining Characteristics of The Curing Reactions and Properties of The Cured Resins Differential scanning calorimetry (DSC) was used for evaluating curing temperatures.

Dyamic Mechanical Analysis (DMA) was used to determine glass transition temperature (Tg) and molecular weight between crosslinks ($M_c$).

Fourier Transform Infrared (FT-IR) spectroscopy was used for monitoring the epoxide content in curing reactions. (The epoxide ring has a characteristic peak at 910–915 cm$^{-1}$).

Near infrared spectroscopy (NIRA) was used to study the epoxy-amine curing reactions since the amine absorption does not overlap the hydroxyl functionality and thus can be used even quantitatively for determining the disappearance of amine.

Nuclear magnetic resonance (NMR) of all the nuclei involved ($^1H$, $^{13}C$, and $^{15}N$), has been used to elucidate the reactions occurring in the curing process. It is difficult to isolate completely pure products due to the similar reactivities of amine hydrogens.

Wet analysis techniques for determining the amount of epoxide or amine remaining at various stages of cure were also used. These methods provide a good measure of the disappearance of functional groups with time, and of the effects of stoichiometry on reaction mechanisms.

D. General Procedure for Curing Reactions

The specified ratios of the two components were weighed and mixed well in a Teflon beaker. The mixture was then placed in an oven at the specified cure temperature for various times as indicated in the Examples. The cooled samples were then analyzed.

The following experiments are reported in the Examples.

| Example I | Curing of DTDA/Epon 828 and DTPDH/Epon 828, respectively, at 1:1 Mol Ratio |
|---|---|
| Example II | Reduction of Cured DTPDH/Epon 828 at 1:1 Mol Ratio |
| Example III | Reoxidation of Reduced Solubilized Polymer of DTPDH/Epon 828 at 1:1 Mol Ratio |
| Example IV | Curing of DTDA/Epon 828 at 1:2 Mol Ratio |
| Example V | Reduction of Cured DTDA/Epon 828 at 1:2 Mol Ratio |
| Example VI | Curing of DTDA/Epon 828 at 1:1.75 Mol Ratio |
| Example VII | Reduction of Cured DTDA/Epon 828 at 1:1.75 Mol Ratio |
| Example VIII | Reoxidation of Reduced Solubilized Polymer of DTDA/Epon 828 at 1:1.75 Mol Ratio |
| Example IX | Curing of 3,3'-Dithiopropionyl Dihydrazide (DTPDH)/Epon 828 at 1:2 Mol Ratio |
| Example X | Reduction of Cured DTPDH/Epon 828 at 1:2 Mol Ratio |
| Example XI | Modification of Reduced Resin with a Bis-maleimide |
| Example XII | Modification of Reduced Resin with Diepoxide Compound |
| Example XIII | Modification of Reduced Resin with Dihalide Compound |

EXAMPLE I

Curing of DTDA/Epon 828 and DTPDH/Epon 828 Respectively, at 1:1 Mol Ratio

The curing agents DTPDH and DTDA were compared with known materials including an aliphatic diamine (hexamethylene diamine—HMDA), an aromatic diamine (methylenedianiline—MDA), and an aliphatic dihydrazide (adipic acid dihydrazide—ADH).

Table 1 shows the onset and peak cure temperatures as obtained by DSC analysis. DTPDH has a lower cure temperature than ADH because the temperature is slightly above its melting point (124°–126° C.) and as a result, dissolution of the curing agent is feasible and reaction occurs. Its cure temperature, however, is higher than that of the aliphatic diamine HMDA, indicating lower reactivity of the hydrazide nitrogen atom. DTDA has a slightly higher cure temperature than MDA.

Equimolar amounts of Epon 828 and the respective curing agent were weighed out accurately in a Teflon beaker. They were then put in an oven at the cure temperature and for the time specified in Table 2 (cure times of 1, 2 and 4 hours were used). The cured resins were then cooled and finely ground to 600 micron size particles which would ensure large surface areas in the subsequent reduction of swollen crosslinked samples.

DSC scanning of cure temperatures for 4 hours showed almost no residual cure indicating that the resins were completely cured.

TABLE 1

| Cure temperatures as obtained from DSC for an equimolar ratio of epoxide to amine | | |
|---|---|---|
| System | Onset °C. | Peak °C. |
| DTPDH + Epon 828 | 139 | 150 |
| DTDA + Epon 828 | 133 | 161 |
| ADH + Epon 828 | 165 | 173 |
| HMDA + Epon 828 | 61 | 86 |
| MDA + Epon 828 | 109 | 134 |

TABLE 2

Curing conditions of Epon 828 and curing agents

| Reaction No. | System | Cure Temp. °C. | Cure Time Hrs. |
|---|---|---|---|
| 33 | HMDA + Epon 828 | 80 | 1 |
| 34 | HMDA + Epon 828 | 80 | 2 |
| 35 | HMDA + Epon 828 | 80 | 4 |
| 36 | MDA + Epon 828 | 100 | 1 |
| 37 | MDA + Epon 828 | 100 | 2 |
| 38 | MDA + Epon 828 | 100 | 4 |
| 39 | DTPDH + Epon 828 | 130 | 1 |
| 40 | DTPDH + Epon 828 | 130 | 2 |
| 41 | DTPDH + Epon 828 | 130 | 4 |
| 42 | DTDA + Epon 828 | 135 | 1 |
| 43 | DTDA + Epon 828 | 135 | 2 |
| 44 | DTDA + Epon 828 | 135 | 4 |

It is seen that disulfide-containing compounds are effective crosslinking agents for epoxy resins. Conditions for curing reactions (determined by DSC) are in a practical range for some compounds and optimum curing temperatures depend on the specific structure. The curing reactions can be conveniently followed by infra red spectroscopy. Disappearance of epoxy functional groups and of terminal $NH_2$ in the crosslinking agent can be detected in the new systems.

EXAMPLE II

Reduction of Cured DTPDH/Epon 828 at 1:1 Mol Ratio 0.5 g of the resin (obtained from Reaction 41, Table 2) was put in a 50 ml round bottom flask. 5 ml dry dioxane and 1 ml water were added. In different experiments (see Table 3), 0.4 g triphenyl phosphine (Reactions 47, 48) or 0.4 ml tributyl phosphine were added (Reactions 45, 46). The reactions were carried out under nitrogen. Reactions were monitored visually until all or almost all the polymer dissolved.

It was observed that the lower temperatures (Reactions 45 and 47) with either tributyl phosphine or triphenyl phosphine gave a larger amount of insoluble material than in the case of reductions at reflux temperatures (reactions 46 and 48). No precipitate of triphenyl phosphine oxide was observed.

TABLE 3

Conditions for reduction of resin DTPDH/Epon 828 1:1, 130° C., 4 hrs. Reaction 41, Table 2

| Reaction No. | Reducing Agent | Temp. °C. | Time Hrs. | % Solubles |
|---|---|---|---|---|
| 45 | Bu₃P | 60 | 12 | 90.34 |
| 46 | Bu₃P | 100 | 24 | 91.98 |
| 47 | Ph₃P | 60 | 12 | 87.40 |
| 48 | Ph₃P | 100 | 24 | 94.90 |

EXAMPLE III

Reoxidation of Reduced Solubilized Polymer of DTPDH/Epon 828 at 1:1 Mol Ratio

A small amount of the clear solution obtained from reaction 48 (Table 3) was treated with a few iodine crystals. Iodine was added until the color persisted. The solution soon started to turn turbid and a precipitate was formed. This qualitatively shows reversible crosslinking in a disulfide cured epoxy resin.

EXAMPLE IV

Curing of DTDA/Epon 828 at 1:2 Mol Ratio

Experiments were carried out with stoichiometric amounts of DTDA and epoxide, i.e., two moles of epoxide resin—Epon 828—to one mole of diamine. DTDA and MDA, as a reference compound were recrystallized from methanol/water solutions and dried well before use. Epon 828 had an epoxide equivalent of 190 (i.e., a molecular weight of 380) as analyzed by the pyridinium chloride method. The DTDA/Epon 828 system has an onset temperature of 140° C. and a peak temperature of 170° C., compared to the MDA/Epon 828 system, with an onset of 116° C. and a peak temperature of 146° C., clearly indicating the lower reactivity of dithiodianiline.

The diamine and Epon 828 were accurately weighed and mixed well in a Teflon beaker at 60° C. till all the diamine dissolved into the resin. The beaker was then placed in an oven at a specific temperature (i.e., 80°, 100°, 140°, 160° C., etc.) and approximately 1.5 grams of the resin were removed at various time intervals. The resin sample (about 0.5 grams, accurately weighed) was then analyzed for epoxy content by the pyridinium chloride method.

Figure 1:
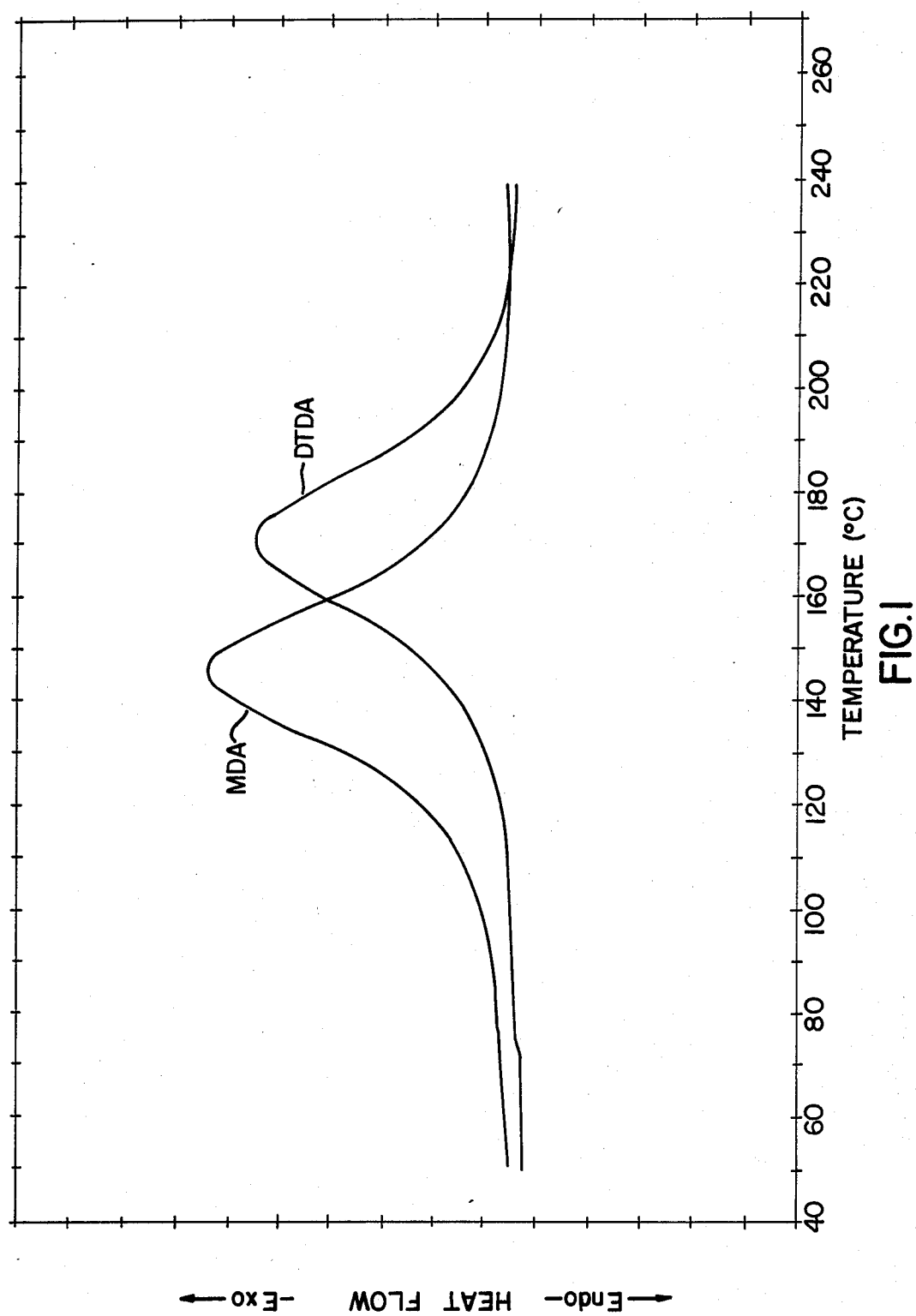
FIG. 1 is a plot of DSC cure thermograms of MDA and DTDA with Epon 828 in a 1:2 molar ratio (amine/epoxide).

Table 4 shows the onset and peak temperatures (from DSC) for Epon 828 with DTDA as well as Epon 828 cured with methylene dianiline (MDA), hexamethylene diamine (HMDA) and adipic acid dihydrazide (ADH)—for comparison. DTDA has a lower reactivity (i.e., requires higher curing temperature) than MDA. FIG. 1 shows the DSC scan for this systems.

Based on the information derived from the DSC scans, curing experiments were carried out to obtain samples of fully cured epoxide resin for characterization and for the study of reduction reactions.

TABLE 4

DSC cure temperatures for DTDA/Epon 828 at 1:2 mol ratio

| Curing Agent | Onset °C. | Peak °C. | Heat of Cure Cure J/g |
|---|---|---|---|
| DTDA | 140.3 | 170.8 | 241 |
| MDA | 116.4 | 146.2 | 410 |
| HMDA | 62.6 | 89.4 | 475 |
| ADH | 165.6 | 172.5 | 329 |

Cure Kinetics

Figure 2:
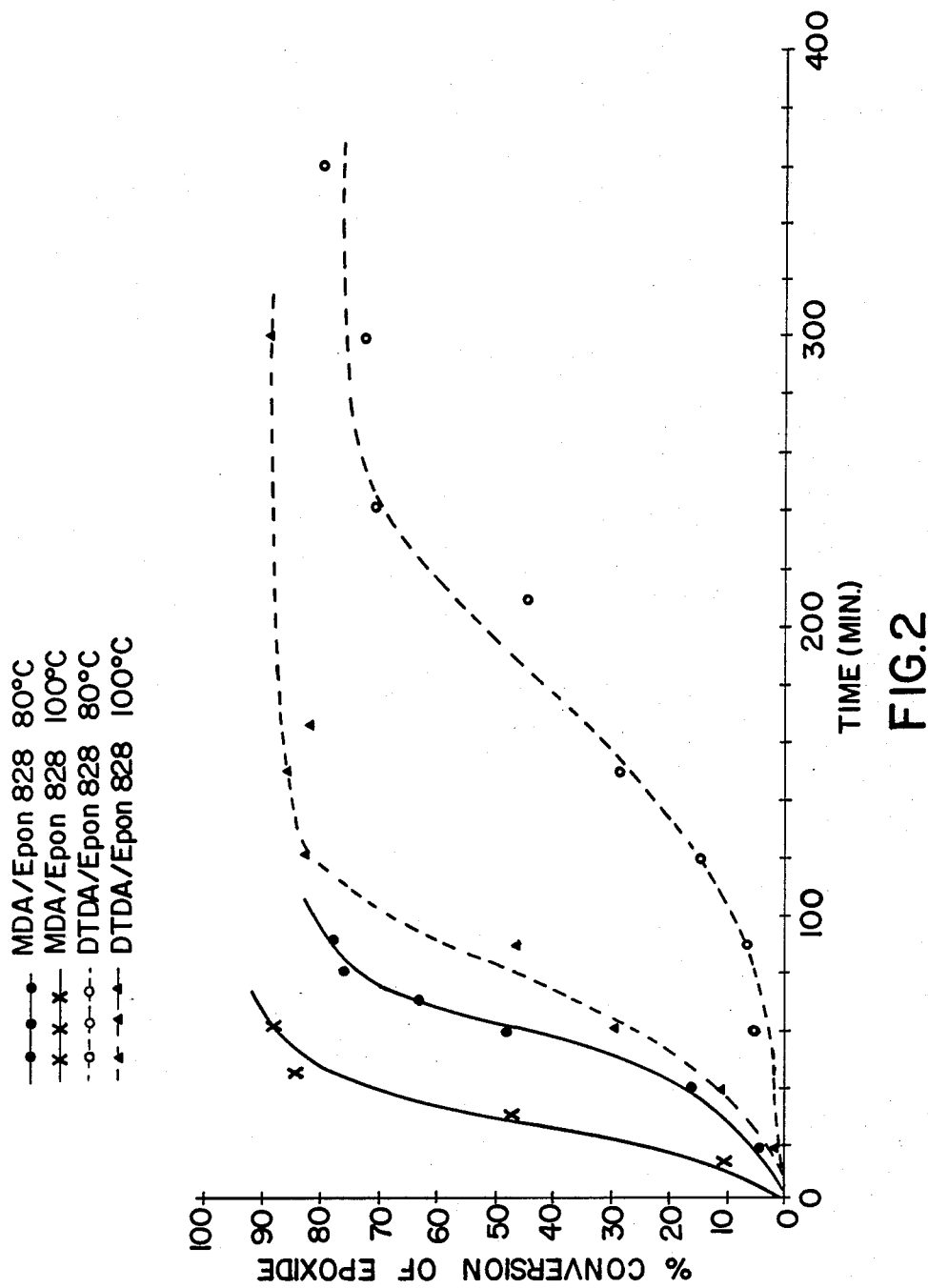
FIG. 2 is a plot of the cure kinetics of MDA and DTDA with Epon 828 in a 1:2 molar ratio (amine/epoxide) at 80° to 100° C.

Due to the lower reactivity of the DTDA/Epon 828 system as compared to the well documented MDA/Epon 828 system, the two stage cure profile established for MDA/Epon 828 (80° C., 2 hrs.; 150° C., 2 hrs.) Bell, J., Polym. Sci., A-2 6, 417 (1970) was not adopted. Epoxide conversion was thus analyzed at different temperatures and various times for both MDA and DTDA. FIG. 2 shows the percent conversion of epoxy groups with time for MDA and DTDA at 80° and 100° C. At 80° C., half the epoxy groups (50%) are consumed after 62 minutes for MDA, and this value is in excellent agreement with the 60 minute value reported by Bell. A cure cycle of 100° C. for 2 hours followed by 160° C. for 2 hours was chosen as the cure profile for DTDA and Epon 828 in 1:2 mol ratio.

Time-Temperature-Transformation (TTT) Cure Diagrams

Figure 3:
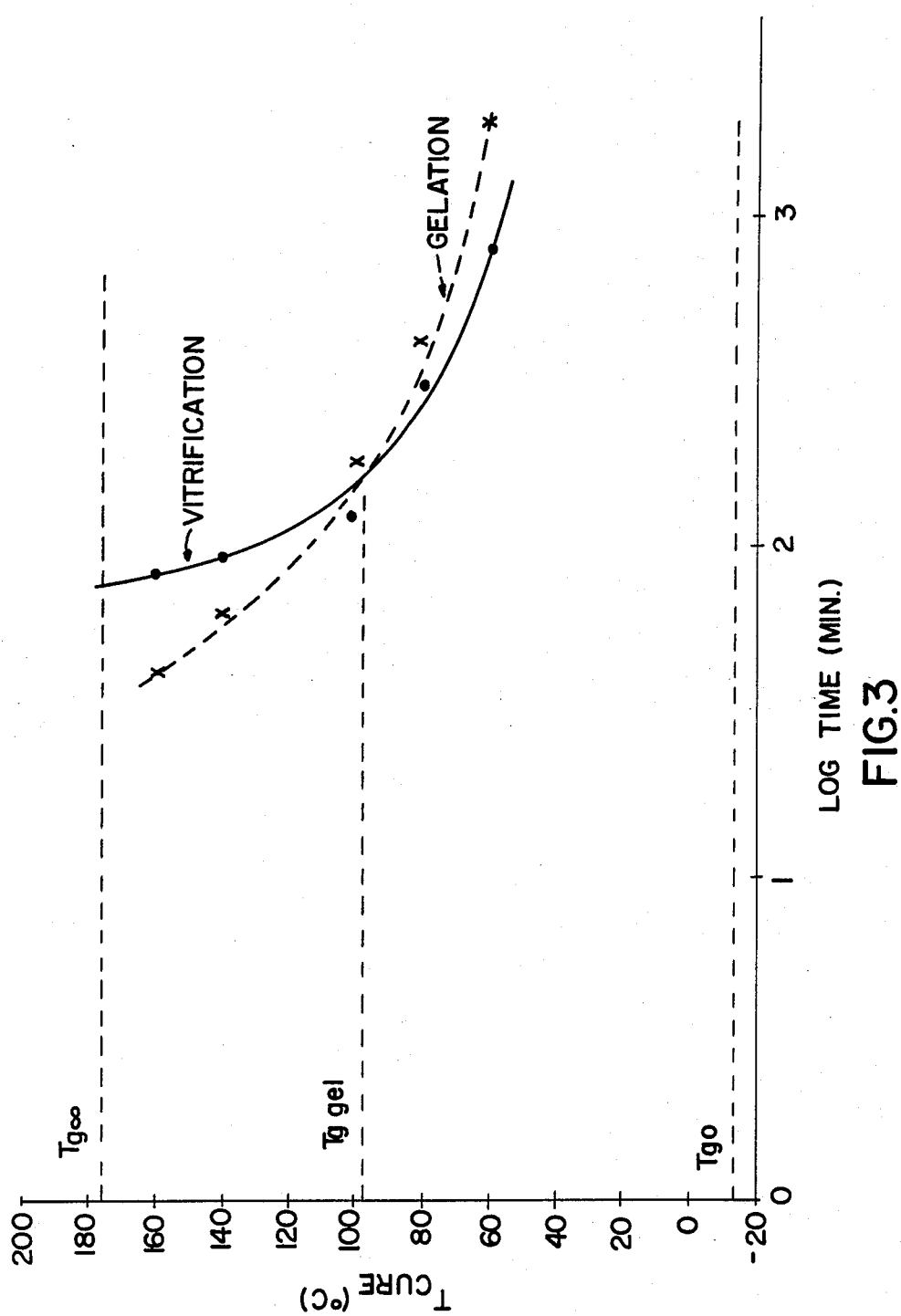
FIG. 3 is a TTT diagram of DTDA and Epon 828 in a 1:2 molar ratio (amine/epoxide).

The TTT cure diagrams described by Gillham, Polym. Eng. Sci. 26, 1429 (1986) have been used to interpret and compare the curing behavior and physical properties of thermosetting systems, depending upon the specific event measured. FIG. 3 shows the TTT cure diagram for the DTDA/Epon 828 system. In this diagram, $Tg_o$ is the glass transition temperature of the unreacted resin mixture, $T_{g_{gel}}$ the glass transition of the gel, and Tg that of the fully cured resin.

Dynamic Mechanical Analysis (DMA)

Figure 4:
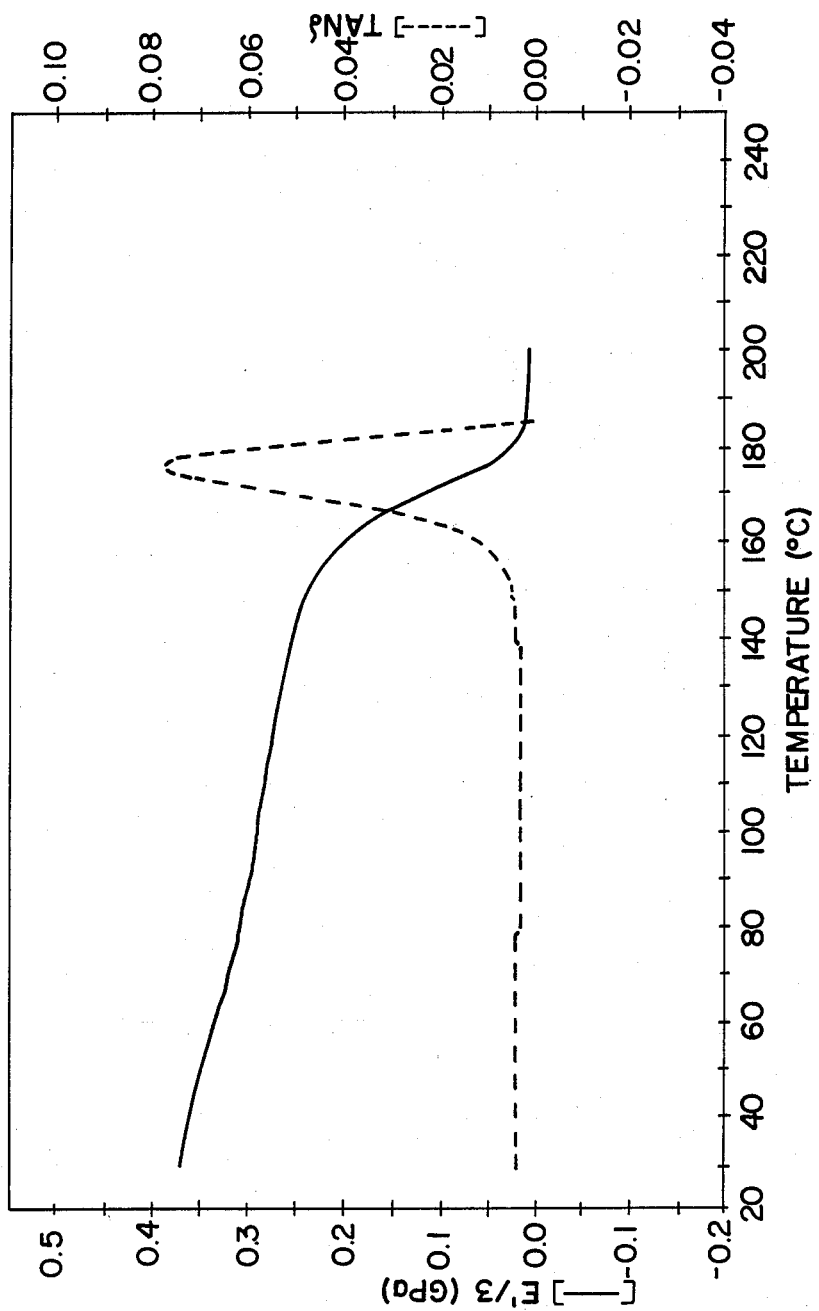
FIG. 4 is a DMA plot of DTDA and Epon 828 in a 1:2 molar ratio (amine/epoxide).

The crosslink density ($M_c$) and the glass transition temperature of the fully cured resin (DTDA/Epon 828) were obtained from DMA measurements. FIG. 4 shows the modulus (used for calculating $M_c$) and Tan (used for calculating Tg) of the resin.

The crosslink density ($M_c$) of the polymer can be calculated by the formula $$M_c = \frac{3\rho RT}{E'} \quad (2)$$

where
$\rho$=density of the polymer,
R=gas constant,
T=absolute temperature at $T_g$+40° C., and
$E'$=Young's modulus.

For the MDA cured resin, a value of 357 was obtained from the Young's modulus (assuming a density of unity for the polymer). This is in good agreement with Bell et al., J. Polym. Sci. A-2 8, 437 (1970), and Kim et al., Am. Tech. Rep. AFML-TR-124 (May 1975-Apr. 1977) -1977, and with the value calculated by theory ($M_c$=319).

For the case of equal stoichiometry, the crosslink density $M_c$ is given by $$M_c = \frac{(aM_A + bM_B)}{3(b - a)} \quad (3)$$

where
a=number of moles of diamine,
b=number of moles of epoxy,
$M_A$=molecular weight of diamine, and
$M_B$=molecular weight of epoxy.

For exact stoichiometry, b=2a, and equation (3) becomes $$M_c = \frac{(M_A + 2M_B)}{3} \quad (4)$$

Assuming complete consumption of reactive groups, the theoretical crosslink densities can be calculated.

The glass transition temperature of the DTDA/Epon 828 system is 176° C. and a crosslink density of $M_c$=370 was obtained from the Young's modulus in the rubbery region, compared to the theoretical value of 336 obtained from equation (4). The results are summarized in Table 5.

TABLE 5

| | Properties of fully cured epoxy resins prepared in Examples IV, VI and IX | | | |
|---|---|---|---|---|
| Cross-linker | Molar[1] Ratio | $T_g$ °C.[2] | $M_c$[2] | $T_D$ °C.[4] |
| MDA[3] | 1:2 | 167 | 357 | 401 |
| DTDA | 1:2 | 176 | 370 | 336.5 |
| MDA[3] | 1:1.75 | 174.5 | 491.5 | 388.1 |
| DTDA | 1:1.75 | 167 | 470 | 332.9 |
| HMDA[3] | 1:2 | 74 | 301 | 369.4 |
| DTPDH | 1:2 | 117.5 | 390 | 302.6 |

[1]Amine:epoxy.
[2]From DMA.
[3]Reference Experiments.
[4]TGA N₂ 20°/min.

EXAMPLE V

Reduction of Cured DTDA/Epon 828 at 1:2 mol ratio

Stoichiometric amounts of DTDA and Epon 828 were accurately weighed and mixed well in a Teflon beaker at 60° C. until the diamine was completely dissolved. The beaker was placed in an oven at 100° C. until the resin just vitrified (approximately 2 hrs.). The resin was then cooled and ground in a blender with liquid nitrogen to 600 micron size particles (a 600 micron sieve was used). The finely powdered resin was transferred to a Teflon dish and cured at 160° C. for an additional 2 hours. Finely powdered resin was used in the reduction experiments in order to provide maximum surface area for the reaction.

Table 6 shows the reagents and conditions studied for the reduction reaction. It is evident that the resin was not reduced to the point of complete dissolution. Triphenyl phosphine (Ph₃P) in dioxane was less effective than tributyl phosphine (Bu₃P) in diglyme. Diglyme swelled the resin more effectively. An added advantage of using tributyl phosphine is that its oxide (obtained as a byproduct in the reduction) is soluble in methanol, whereas the reduced resin (presumably) is not. The reduced sample can thus be washed several times with methanol to remove impurities.

TABLE 6

| | Reduction reactions of DTDA/Epon 828 in a 1:2 mol ratio diamine/epoxide | | | |
|---|---|---|---|---|
| Reaction* | Solvent | Reducing Agent | Time (Days) | Gel % (Insolubles) |
| 1 | dioxane | Ph₃P | 3 | 100 |
| 2 | dioxane | Ph₃P | 8 | 89 |
| 3 | dioxane | Bu₃P | 7 | 80 |
| 4 | diglyme | Bu₃P | 7 | 65 |
| 5 | diglyme | Bu₃P | 10 | 65 |
| 6 | diglyme | NaBH₄/AlCl₃ | 7 | 70 |

*All reactions were at reflux temperatures of the corresponding solvents under an inert (N₂) atmosphere. (Dioxane - 100° C.; diglyme - 160° C.).

EXAMPLE VI

Curing of DTDA/Epon 828 at a 1:1.75 Mol Ratio

The curing procedures described in Examples I and IV were followed using a mole ratio of DTDA to Epon 828 of 1:1.75.

Figure 5:
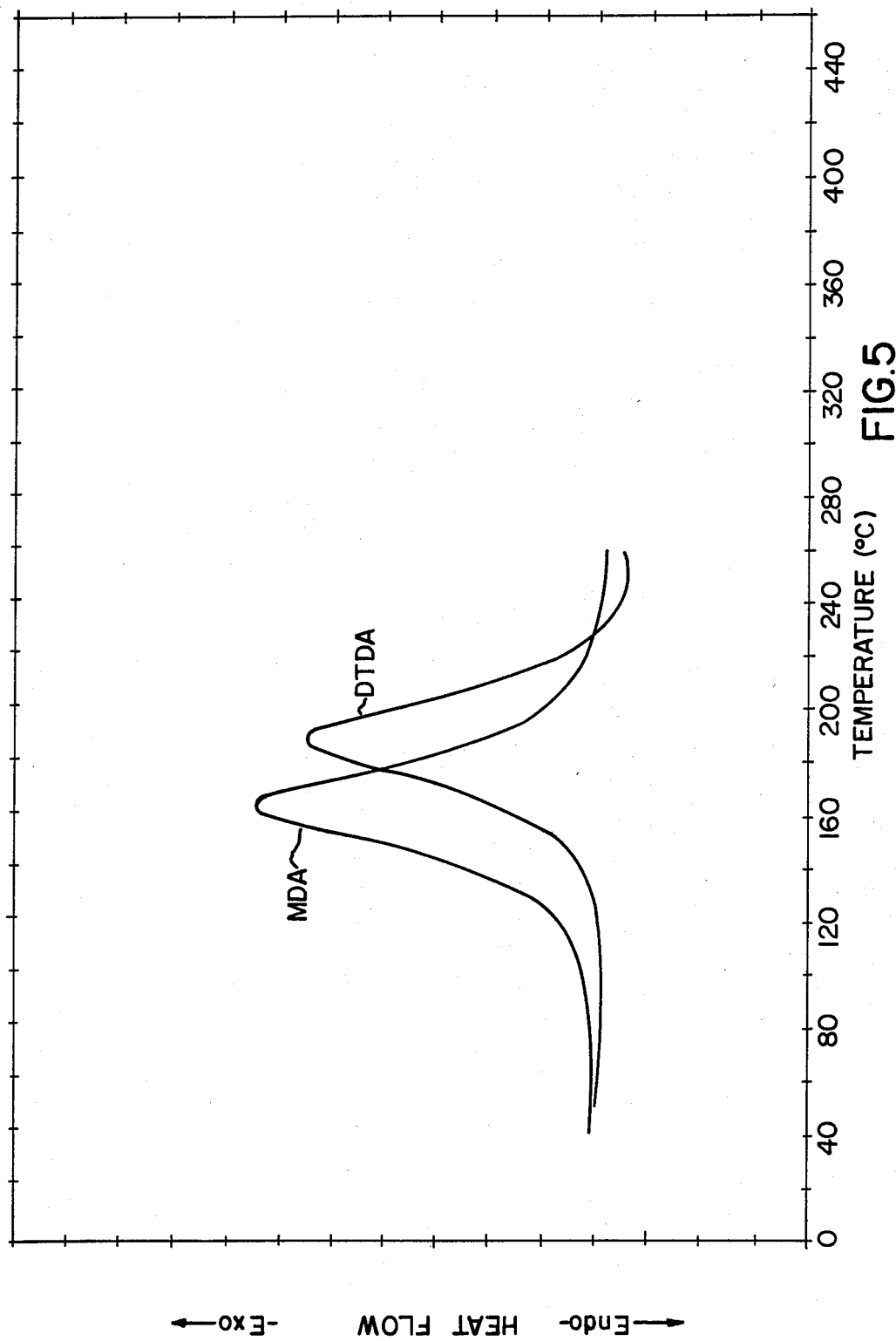
FIG. 5 is a DSC cure thermogram of DTDA and MDA with Epon 828 in a 1:1.75 molar ratio (amine/epoxide).
Figure 6:
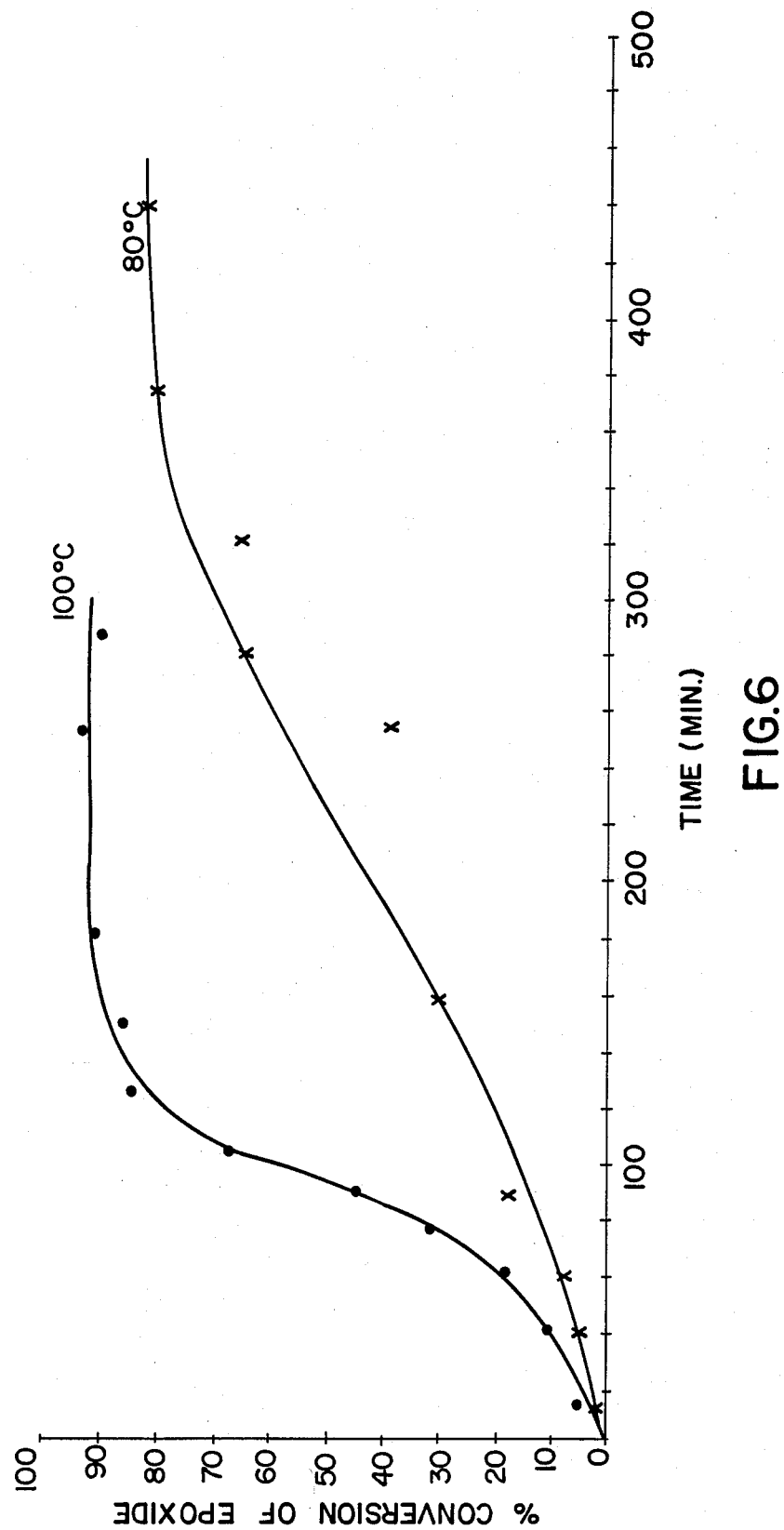
FIG. 6 is a plot of the cure kinetics of DTDA and Epon 828 in a 1:1.75 molar ratio (amine/epoxide) at 80° C. and 100° C.

FIG. 5 shows the DSC profiles for Epon 828 with DTDA and with MDA at a 1:1.75 molar ratio of diamine to epoxide. DTDA once again showed lower reactivity (onset 154.4° C.). FIG. 6 shows the percent conversion of epoxy groups with time for DTDA/Epon 828 (1:1.75 mole ratio) at 80° C. and 100° C. The curing reaction at 80° C. is very slow, and, at 100° C., 57.1% of the epoxy groups (i.e., reaction of all primary amine) are reacted after 94 minutes. A cure profile of 100° C. for 2 hours followed by 150° C. for 2 hrs. was selected for this system.

Conversion of Epoxide as a Function of Glass Transition Temperature

Figure 7:
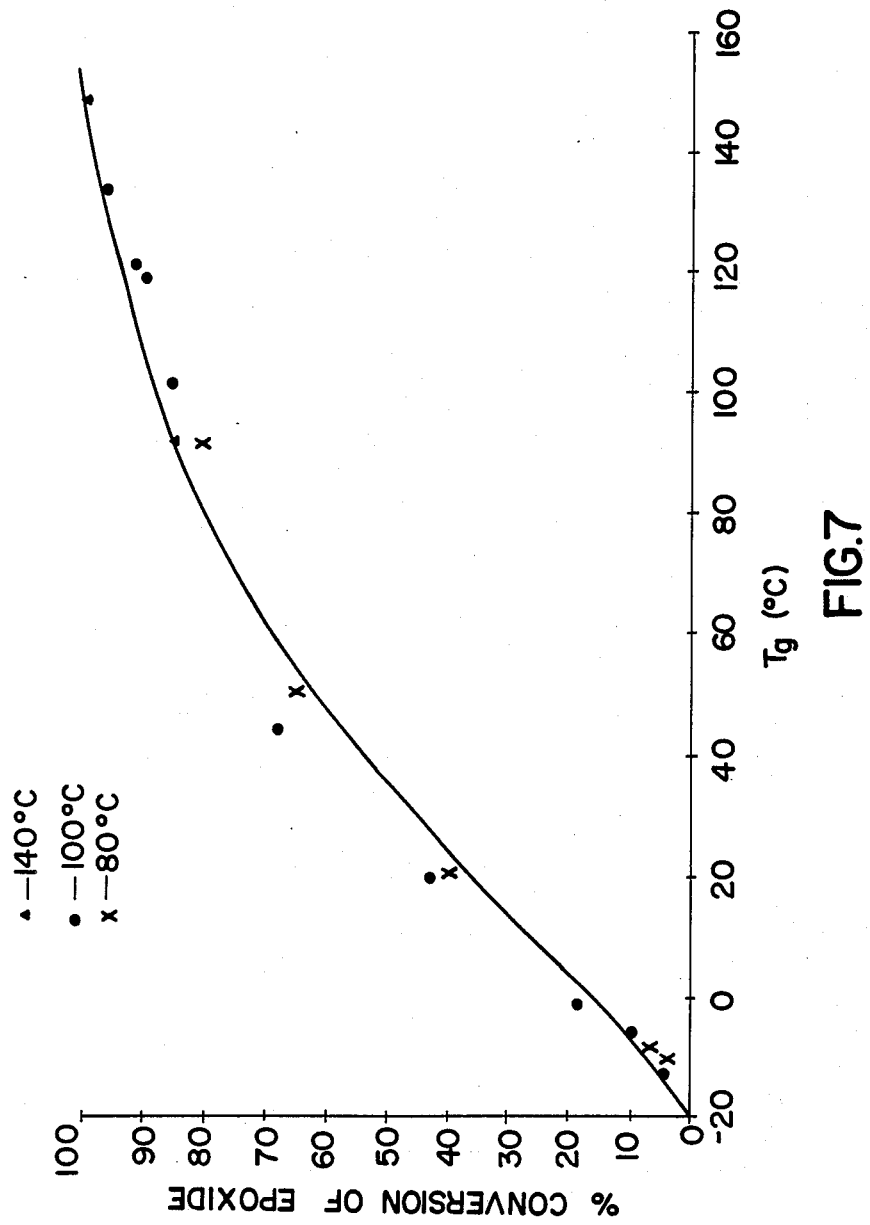
FIG. 7 is a plot of $T_g$ versus percent conversion of epoxide for DTDA/Epon 828 in a 1:1.75 molar ratio (amine/epoxide).

Intermediate stages of cure were analyzed for epoxy content and correlated with their respective glass transition temperatures as shown in FIG. 7. A hundred percent (100%) conversion corresponds to the maximum glass transition temperature of 167° C.

Percent Gel as a Function of Glass Transition Temperature

About 0.5 grams of accurately weighed resin was placed in a 50 ml round bottom flask with 25 ml diglyme. The solution was refluxed for 2 hours, cooled, and filtered. The solid was dried and weighed to constant weight. Percent gel was calculated as follows:

$$\% \text{ gel} = \frac{\text{weight of solid after extraction}}{\text{initial weight of resin}} \times 100$$

Figure 8:
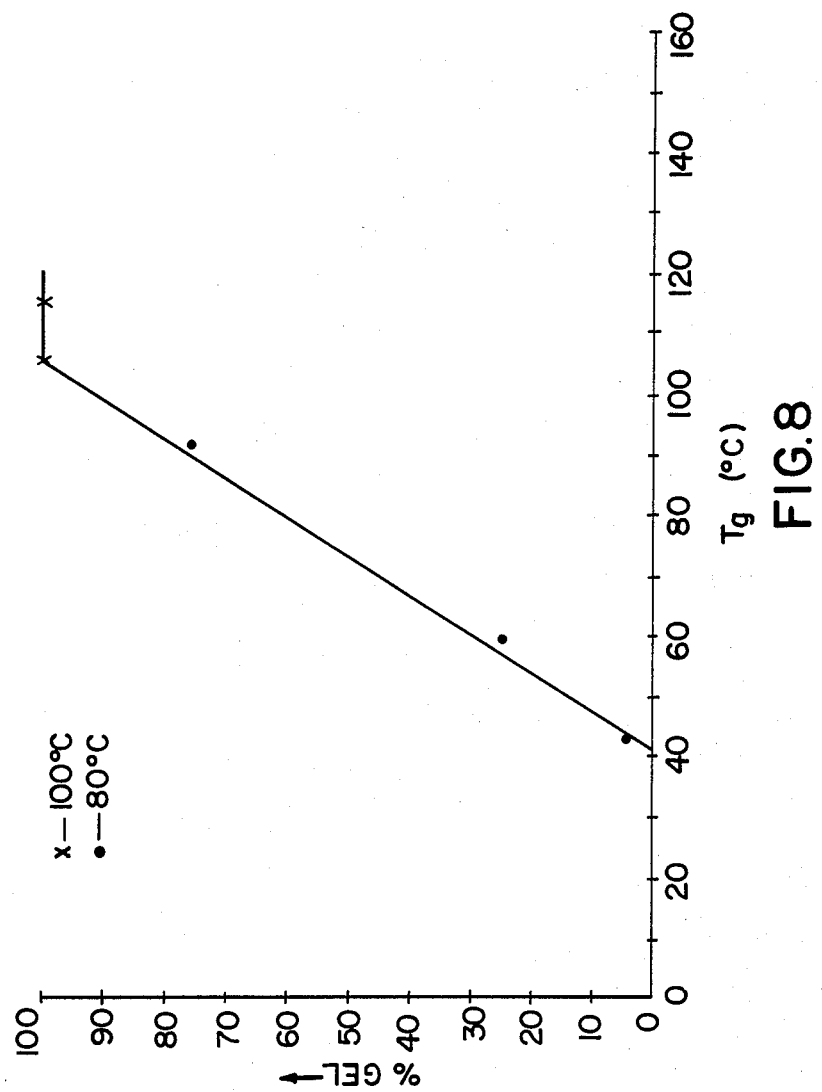
FIG. 8 is a plot of $T_g$ versus percent gel for DTDA/Epon 828 in a 1:1.75 molar ratio (amine/epoxide).

FIG. 8 shows the results for DTDA/Epon 828. Below a $T_g$ of 41° C. the resin is completely soluble and above a Tg of 105° C. it is completely gelled.

TTT Cure Diagram

Figure 9:
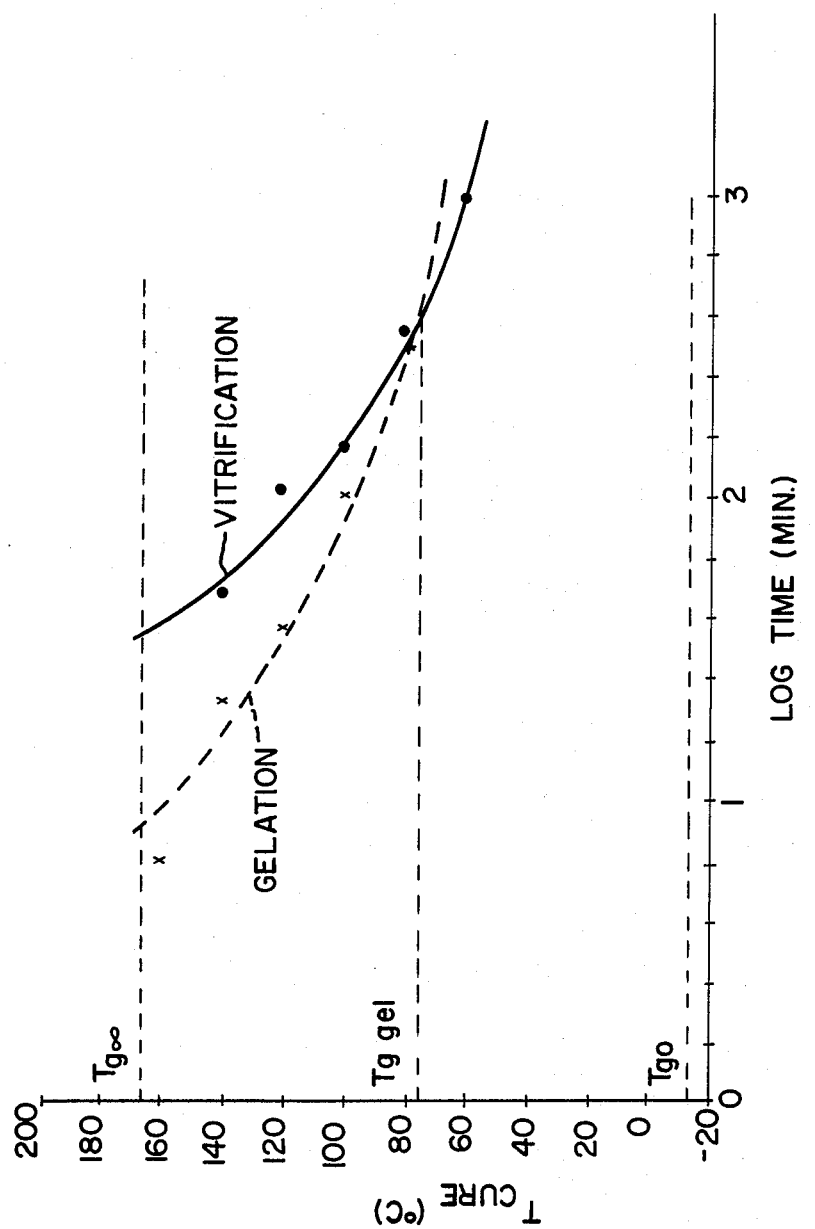
FIG. 9 is a TTT diagram for DTDA/Epon 828 in a 1:1.75 molar ratio (amine/epoxide).

The TTT cure diagram for DTDA/Epon 828 at a 1:1.75 molar ratio (diamine/epoxide) is shown in FIG. 9. The times to gelation and vitrification are longer compared with the 1:2 molar ratio system (FIG. 3).

Crosslink Density

Figure 10:
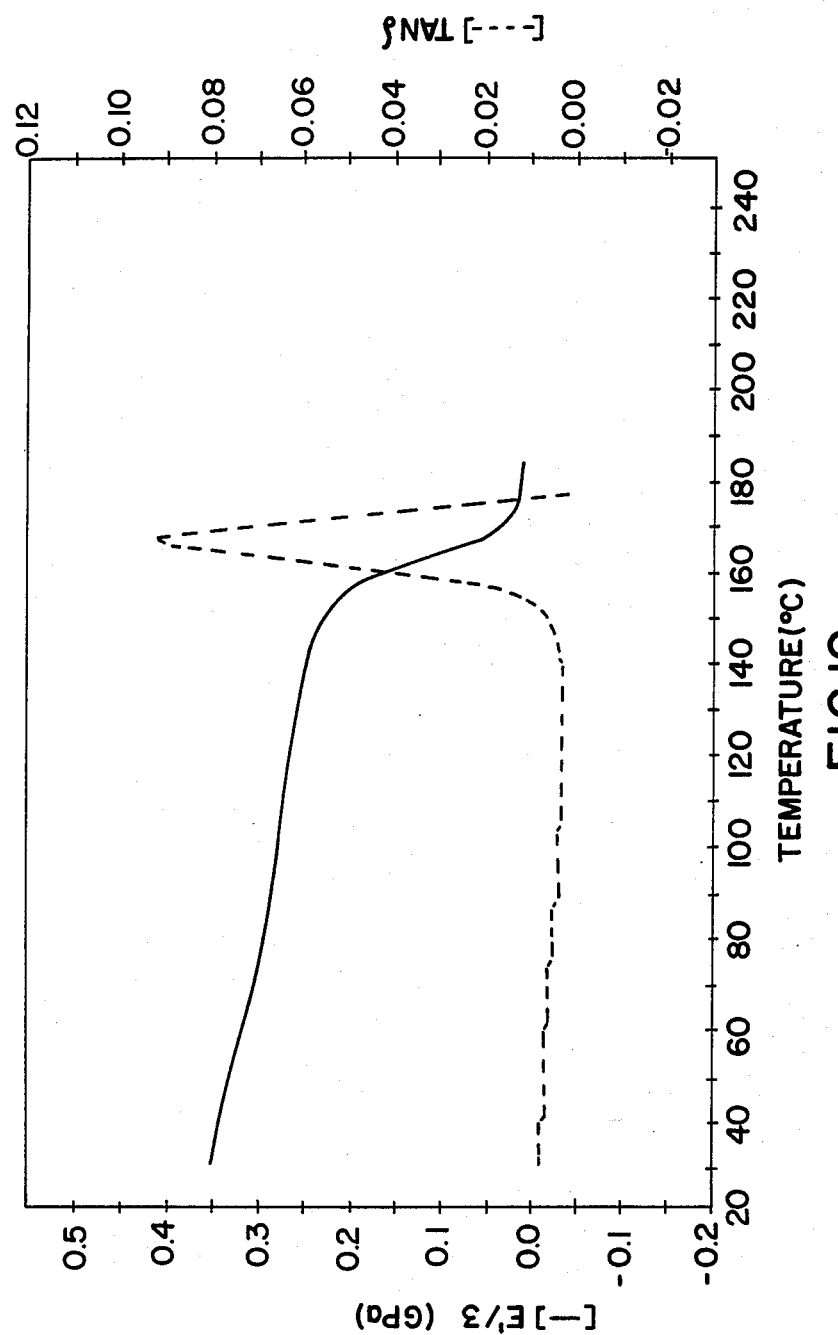
FIG. 10 is a DMA plot of DTDA/Epon 828 in a 1:1.75 molar ratio (amine/epoxide).

FIG. 10 is the DMA plot of the modulus and Tanδ for the fully cured resin. A glass transition of 167° C. is obtained from the Tanδ max and a crosslink density of 470. This value is significantly higher than obtained for the 1:2 mole ratio ($M_c$=370) system, and the lower crosslink density is expected to facilitate the reduction reaction.

EXAMPLE VII

Reduction of Cured DTDA/Epon 828 at 1:1.75 Mol Ratio

Samples of fully cured resin at the 1:1.75 mol ratio were prepared as described previously, using a cure profile of 100° C. for 2 hours and 150° C. for 2 hours.

Figure 11:
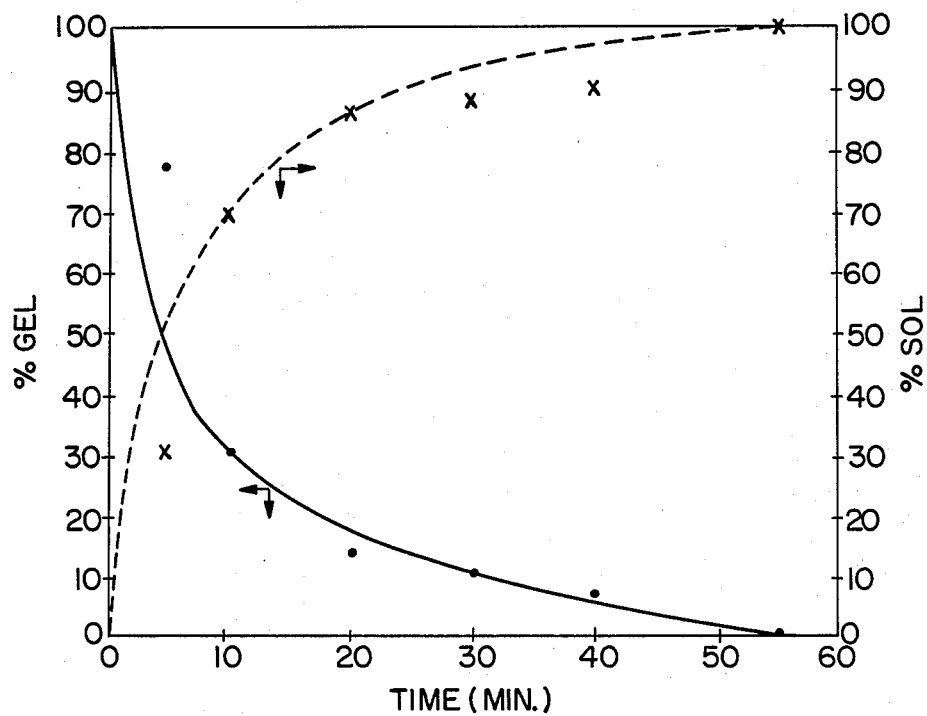
FIG. 11 is a plot of percent sol and gel (insolubles) in the reduction of fully cured DTDA/Epon 828 (1:1.75) with time.

About 1 gram of the fully cured resin was accurately weighed in a 100 ml round bottomed flask. 25 ml diglyme was added followed by 5 drops of water containing HCl (from a stock solution of 15 ml water containing 2 drops conc. HCl). 1.5 tributyl phosphine was then added and the solution was refluxed under nitrogen. Six different samples were prepared in this manner. Refluxing was continued for various lengths of time (5, 10, 20, 30, 40, 55 minutes). At each of the specified times, a sample of the solution was filtered and the gel was washed with minimal diglyme followed by 5 ml methanol, and then dried to constant weight and weighed. The filtrate was poured into excess water. A soft solid was obtained. The liquid was carefully decanted from the solid. The solid was washed several times with methanol, the methanol being decanted every time. The solid was then transferred to a weighed vial, dried under vacuum to constant weight and weighed. Percent sol and gel were calculated. The plot is shown in FIG. 11. The rate of reduction is very fast during the first 10 minutes, after which reduction is more gradual, and complete dissolution occurs at 55 minutes.

Figure 12:
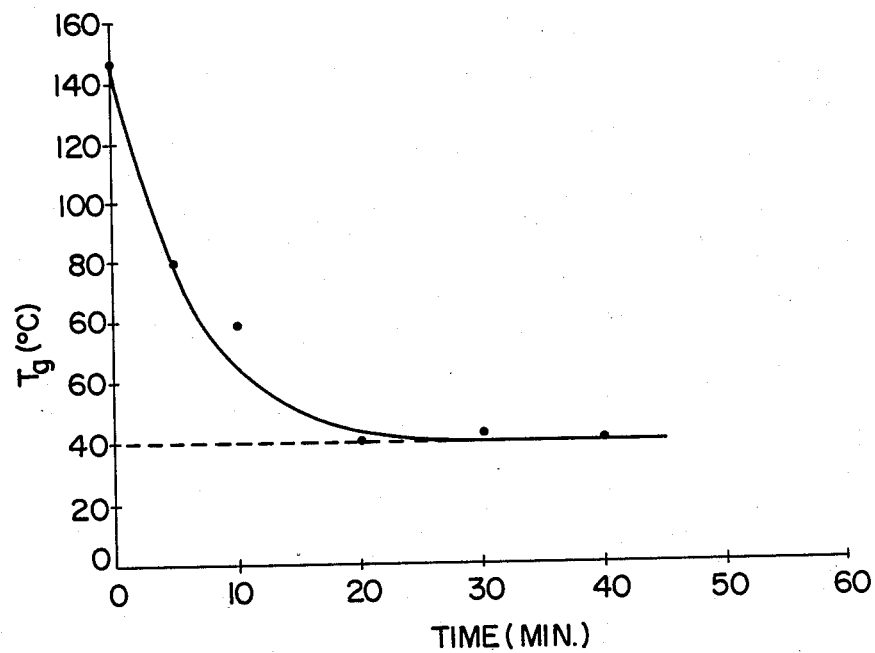
FIG. 12 is a plot of $T_g$ of unreduced gel (insolubles) of DTDA/Epon 828 (1:1.75) with time.

FIG. 12 is the plot of the glass transition temperature of the gel from the reduction versus time. The glass transition temperature decreases with time and reaches a plateau at a value of approximately 40° C. In curing of the resin, the resin is soluble below a Tg of 41° C. and gels above this temperature (see FIG. 8).

EXAMPLE VIII

Reoxidation of Reduced Solubilized Polymer of DTDA/Epon 828 at 1:1.75 Mol Ratio

To 0.4 grams of the fully reduced solubilized sample obtained in Example VII dissolved in 15 ml dioxane, an iodine solution in dioxane was added dropwise. A precipitate gradually formed. The mixture was warmed slightly (approximately 60° C.). When the iodine color disappeared, a few additional drops of the iodine solution were added. This process was continued until the iodine color just persisted. The solid obtained was filtered, washed with dioxane, and then several times with methanol. It was then dried well.

EXAMPLE IX

Curing of 3,3'-Dithiopropionyl Dihydrazide (DTPDH) /Epon 828 at 1:2 Mol Ratio

Stoichiometric amounts of curing agent and epoxide (i.e., 1 mole curing agent and 2 moles epoxide) were used. FIG. 13 shows the DSC scans of DTPDH and HMDA which was used as a reference. The aliphatic diamine is clearly more reactive; DTPDH reacts only after it melts and dissolves into the resin.

The cure kinetics of DTPDH and HMDA is shown in FIGS. 14 and 15 respectively and the difference in reactivity of the dihydrazide and the diamine is evident. The dihydrazide does not have a uniform cure profile: this is seen in the scatter of experimental points in FIG. 14 at 130° C. and 150° C. The dihydrazide reacts as soon as it melts into the epoxy resin. As a result, there may be localized areas of unmelted (i.e., unreacted) curing agent and other domains of melted and reacted curing agent which soon gels. This poses a problem in the preparation of uniformly cured samples. A temperature of 110° C. was also examined and the cure, though slower, proceeded more uniformly. This temperature was therefore selected as the first stage of the cure profile for DTPDH. Later it was found that if a cure temperature of 130° C. is used as the first stage for larger samples, the highly exothermic curing reaction increases the temperature in the bulk of the resin mixture sufficiently to cause some discoloration in the resin. A cure temperature of 130° C. was chosen for the second stage of the cure profile for DTPDH.

FIG. 16 shows the plot of glass transition temperature versus percent conversion of epoxy groups, and FIG. 17 is the plot of glass transition temperature versus the percent gel; below a Tg of 10° C. the resin is completely soluble and complete gelation is observed only when the Tg approaches that of the fully cured resin.

Crosslink Density

FIGS. 18 and 19 are the DMA thermograms for HMDA and DTPDH respectively. A glass transition temperature of 74° C. and an $M_c$ of 301 was obtained for HMDA (theoretical value for $M_c$=292). The fully cured resin from DTPDH had a Tg of 117.5° C. and $M_c$=390 (theoretical $M_c$=332). The results are summarized in Table 5.

EXAMPLE X

Reduction of Cured DTPDH/Epon 828 at 1:2 Mol Ratio

The samples for reduction were prepared as described previously using a cure profile of 110° C.—2 hours, and 130° C.—2 hours. Trial reduction reactions showed that diglyme was a much better solvent than dioxane because it swelled the cured resin making it more accessible to the reducing agent and therefore susceptible to cleavage.

About 0.5 grams of the fully cured resin of Example IX was accurately weighed in a 50 ml round bottomed flask. 15 ml diglyme was added followed by 2 drops of water containing HCl (from a stock solution of 15 ml water containing 2 drops conc. HCl). 4 ml tributyl phosphine was then added via a syringe, and the solution was refluxed under nitrogen. Six different samples were prepared in this manner. The reflux was continued for various lengths of time (1, 2, 3, 4, 5, 6 days) to complete dissolution. At the specified time the solution was filtered immediately, and the gel was washed with a minimal amount of diglyme, dried to constant weight and weighed. The filtrate was poured into excess water and allowed to stand overnight. The liquid was carefully decanted from the solid. The solid was washed once with water and methanol, transferred to a weighed vial, and dried under vacuum to constant weight. Percent gel and sol were calculated for various times and plotted versus time (FIG. 20).

EXAMPLE XI

Modification of Reduced Resin with a Bis-maleimide

A known weight of the reduced resin from Example X is dissolved in diglyme and to this is added a bis-maleimide (e.g., p-phenylene diamine bis-maleimide, methylene dianiline bis-maleimide). The weight of the bis-maleimide added is calculated from the thiol (—SH) content of the reduced resin. A basic catalyst, for example, triethylamine, is also added to initiate thiolate formation and the solution is stirred at 25° to 170° C. The solution is cooled and poured into methanol and the resulting solid filtered and dried. A modified polymer is obtained.

EXAMPLE XII

Modification of Reduced Resin with Diepoxide Compound

To a weighed amount of the reduced resin from Example X in diglyme is added from 10% to 50% by weight of the diepoxide from which the resin was originally formed, and a basic catalyst, for example, benzyl dimethylamine or triethylamine. The solution is warmed (100°-160° C.) for 4-12 hours, cooled, and a little HCl/diglyme solution is added to it. This solution is poured into methanol. The resulting solid is filtered and dried. A modified polymer is obtained.

EXAMPLE XIII

Modification of Reduced Resin with Dihalide Compound

A known weight of the reduced resin from Example X is dissolved in diglyme and to this is added '-dibromo-p-xylene. The weight of the '-dibromo-p-xylene added is calculated from the thiol (—SH) content of the reduced resin. A basic catalyst is also added to initiate thiolate formation and the solution is stirred at 20° C. to 170° C. The solution is cooled and poured into methanol and the resulting solid filtered and dried. A modified polymer is obtained.

What is claimed is:

1. A method for the preparation of insoluble, infusible epoxy resins containing reversible crosslinks comprising the steps of:
   (a) forming a reaction mixture of
      (i) an epoxy compound having two or more epoxy groups, and
      (ii) a crosslinking agent containing two or more epoxy-reactive groups and further containing a single disulfide bond, and
   (b) curing said reaction mixture under conditions conducive to the formation of a crosslinked resin.

2. A method for the preparation of insoluble, infusible epoxy resins containing reversible crosslinks comprising the steps of:
   (a) forming a reaction mixture of
      (i) an epoxy compound having two or more epoxy groups, and
      (ii) a crosslinking agent containing two or more epoxy-reactive groups and further containing a disulfide bond, said crosslinking agent being selected from compounds having the formula

where Q is an epoxy-reactive functional group selected from

and X is a divalent aromatic or aliphatic hydrocarbon radical of one to ten carbon atoms, and
   (b) curing said reaction mixture under conditions conducive to the formation of a crosslinked resin.

3. A method as recited in claim 1 wherein said epoxy compound contains two epoxy groups.

4. A method as recited in claim 3 wherein said epoxy resin is made from bisphenol A and epiclorohydrin having the formula

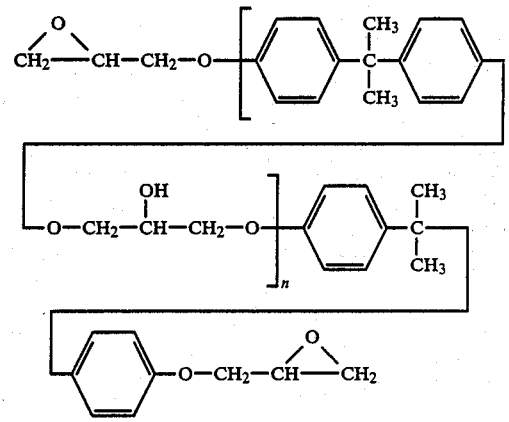

where n is a number from 0 to 20.

5. A method as recited in claim 4 wherein n is a number from 0.2 to 10.

6. A method as recited in claim 2 wherein said epoxy resin contains 3 or 4 epoxy groups.

7. A method as recited in claim 6 wherein said epoxy resin is

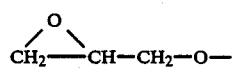

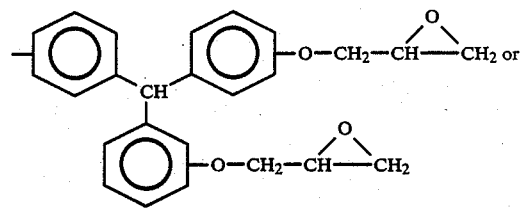

-continued

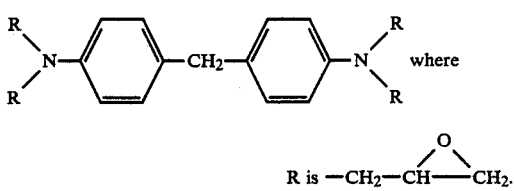

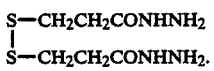

8. A method as recited in claim 2 wherein said crosslinking agent is

S—CH₂CH₂CONHNH₂
|
S—CH₂CH₂CONHNH₂.

9. A method as recited in claim 2 wherein said crosslinking agent is

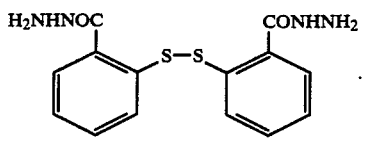

10. A method as recited in claim 2 wherein said crosslinking agent is

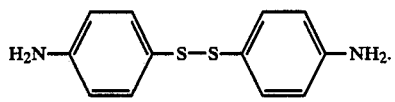

11. A method as recited in claim 2 wherein the curing takes place at a temperature of 25° to 200° C. for from 2 to 48 hours.

12. A method as recited in claim 5 wherein the epoxy compound is

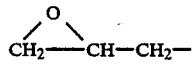

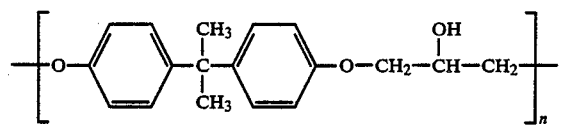

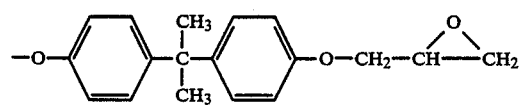

n = 0.2

13. A method for the preparation of insoluble, infusible epoxy resins containing reversible crosslinks and for the recovery of soluble polymers therefrom comprising the steps of:
(a) forming a reaction mixture of
  (i) an epoxy compound having two or more epoxy groups, and
  (ii) a crosslinking agent containing two or more epoxy-reactive groups and further containing a disulfide bond,
(b) curing said reaction mixture under conditions conducive to the formation of a crosslinked resin, and
(c) cleaving the disulfide bonds in said resin by reducing said resin in the presence of solvent and a reducing agent and thereby forming a soluble polymer.

14. A method for the preparation of insoluble, infusible epoxy resins containing reversible crosslinks and for the recovery of soluble polymers therefrom comprising the steps of:
(a) forming a reaction mixture of
  (i) an epoxy compound having two or more epoxy groups, and
  (ii) a crosslinking agent containing two or more epoxy-reactive groups and further containing a disulfide bond, said crosslinking agent being selected from compounds having the formula

Q—X—S—S—X—Q where Q is an epoxy-reactive functional group selected from

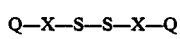
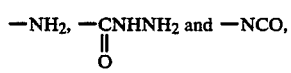

and X is a divalent aromatic or aliphatic hydrocarbon radical of one to ten carbon atoms,
(b) curing said reaction mixture under conditions conducive to the formation of a crosslinked resin, and
(c) cleaving the disulfide bond in said resin by reducing said resin in the presence of a solvent and a reducing agent selected from the group consisting of trialkyl and triaryl phosphine, alkali metal borohydride, alkali metal aluminum hydride and alkali metal trialkyl borohydride, and thereby forming a soluble polymer.

15. A method as recited in claim 14 wherein said reducing agent is one that can provide a homogeneous reaction environment for said reduction cleavage.

16. A method as recited claim 15 wherein said reducing agent is triphenyl phosphine.

17. A method as recited claim 15 wherein said reducing agent is tributyl phosphine.

18. A method as recited in claim 14 wherein the solvent employed in the reduction step is diglyme.

19. A method as recited in claim 14 wherein the solvent employed in the reduction step is dioxane.

20. A method for preparing insoluble, infusible epoxy resins containing reversible crosslinks, recovering soluble polymers therefrom and reforming the insoluble, infusible resin, comprising the steps of:
(a) forming a reaction mixture of
  (i) an epoxy compound having two or more epoxy groups, and
  (ii) a crosslinking agent containing two or more epoxy-reactive groups and further containing a disulfide bond,
(b) curing said reaction mixture under conditions conducive to the formation of a crosslinked resin,
(c) cleaving the disulfide bonds in said resin by reducing said polymer in the presence of a solvent and a reducing agent, and
(d) reforming the said disulfide bonds by oxidizing the cleaved product formed in step (c).

21. A method for preparing insoluble, infusible epoxy resins containing reversible crosslinks, recovering soluble polymers therefrom and reforming the insoluble, infusible resin, comprising the steps of:
   (a) forming a reaction mixture of
      (i) an epoxy compound having two or more epoxy groups, and
      (ii) a crosslinking agent containing two or more epoxy-reactive groups and a disulfide bond, said crosslinking agent being selected from compounds having the formula

Q—X—S—S—X—Q where Q is an epoxy-reactive functional group selected from

and X is a divalent aromatic or aliphatic hydrocarbon radical of one to ten carbon atoms,
   (b) curing said reaction mixture under conditions conducive to the formation of a crosslinked resin,
   (c) cleaving the disulfide bonds in said resin by reducing said resin in the presence of a solvent and a reducing agent selected from the group consisting of trialkyl and triaryl phosphine, alkali metal borohydride, alkali metal aluminum hydride and alkali metal trialkyl borohydride and thereby forming a soluble polymer containing thiol groups, and
   (d) reforming the said disulfide bonds by oxidizing the soluble, thiol-containing polymer formed in step (c) in the presence of an oxidizing agent selected from iodine, hydrogen peroxide, potassium iodide, air, and oxygen.

22. A method as recited in claim 21 wherein the oxidizing agent is air.

23. A method as recited in claim 21 wherein the oxidizing agent is idione.

24. A method as recited in claim 21 wherein the oxidizing agent is oxygen.

25. A method as recited in claim 21 wherein the oxidizing agent is hydrogen peroxide.

26. A method for preparing insoluble, infusible epoxy resins containing reversible crosslinks, recovering soluble polymers therefrom and modifying those soluble polymers comprising the steps of:
   (a) forming a reaction mixture of
      (i) an epoxy compound having two or more epoxy groups, and
      (ii) a crosslinking agent containing two or more epoxy-reactive groups and further containing a disulfide bond,
   (b) curing said reaction mixture under conditions conducive to the formation of a crosslinked resin,
   (c) cleaving the disulfide bonds in said resin by reducing said resin in the presence of a reducing agent and thereby forming a soluble, thiol-containing polymer, and
   (d) modifying the soluble, thiol-containing polymers obtainded in step (c).

27. A method for preparing insoluble, infusible epoxy resins containing reversible crosslinks, recovering soluble polymers therefrom and reforming the insoluble, infusible resin, comprising the steps of:
   (a) forming a reaction mixture of
      (i) an epoxy compound having two or more epoxy groups, and
      (ii) a crosslinking agent containing two or more epoxy-reactive groups and a disulfide bond, said crosslinking agent being selected from compounds having the formula

Q—X—S—S—X—Q, where Q is an epoxy-reactive functional group selected from

and X is a divalent aromatic or aliphatic hydrocarbon radical of one to ten carbon atoms,
   (b) curing said reaction mixture under conditions conducive to the formation of a crosslinked resin,
   (c) cleaving the disulfide bond in said resin by reducing said resin in the presence of a reducing agent selected from the group consisting of trialkyl and triaryl phosphine, alkali metal borohydride, alkali metal aluminum hydride and alkali metal trialkyl borohydride and thereby forming a soluble, thiol-containing polymer; and
   (d) modifying the soluble, thiol-containing polymer obtained in step (c) by
      (i) crosslinking with bis-maleimides of aromatic diamines or with other bifunctional activated vinyl crosslinking agents; or
      (ii) crosslinking with dihalides to form stable thioether linkages in the resin; or
      (iii) reacting, in base-catalyzed reactions, with diepoxides or virgin epoxy resins to optimize the properties of the polymer and obtain interpenetrating polymer networks (IPN); or
      (iv) grafting of rubber particles which can become covalently bound to the resin and impart enhanced toughness.

28. A method as in claim 27 wherein the soluble thiol-containing polymer is modified by crosslinking with bis-maleimides of aromatic diamines.

29. A method as in claim 27 wherein the soluble thiol-containing polymer is modified by crosslinking with dihalides to form stable thioether linkages in the resin.

30. A method as in claim 27 wherein wherein the soluble thiol-containing polymer is modified by reacting, in base-catalyzed reactions, with diepoxides or virgin epoxy resins to optimize the properties of the polymer and obtain interpenetrating polymer networks (IPN).

31. A method as in claim 27 wherein wherein the soluble thiol-containing polymer is modified by grafting of rubber particles which can become covalently bound to the resin and impart enhanced toughness.

32. A method as in claim 27 wherein wherein the soluble thiol-containing polymer is modified by crosslinking with bifunctional activated vinyl crosslinking agents.

33. A method for the conversion to a soluble polymer of a crosslinked, insoluble, infusible epoxy resin formed by curing
   (i) an epoxy compound having two or more epoxy groups, and
   (ii) a crosslinking agent containing two or more epoxy-reactive groups and further containing a disulfide bond, comprising the step of cleaving the disulfide bonds in said resin by reducing said resin in the presence of a solvent and a reducing agent.

34. A method for the conversion to a soluble polymer of a crosslinked, insoluble, infusible epoxy resin formed by curing
   (i) an epoxy compound having two or more epoxy groups, and
   (ii) a crosslinking agent containing two or more epoxy-reactive groups and further containing a disulfide bond, comprising the step of cleaving the disulfide bond in said resin by reducing said resin in the presence of a solvent and a reducing agent selected from the group consisting of trialkyl and triaryl phosphine, alkali metal borohydride, alkali metal aluminum hydride and alkali metal trialkyl borohydride.

35. A method as recited in claim 33 wherein said reducing agent is one that can provide a homogeneous reaction environment for said reduction cleavage.

36. A method as recited in claim 33 wherein said reducing agent is triphenyl phosphine.

37. A method as recited in claim 33 wherein said solvent is tributyl phosphine.

38. A method as recited in claim 33 wherein said solvent is dioxane or diglyme.

39. A method for the conversion to a polymer of a crosslinked, insoluble, infusible epoxy resin formed by curing
   (i) an epoxy compound having two or more epoxy groups, and
   (ii) a crosslinking agent containing two or more epoxy-reactive groups and further containing a disulfide bond, comprising the steps of
   (a) cleaving the disulfide bonds in said resin by reducing said resin in the presence of a solvent and a reducing agent, and
   (b) reforming the disulfide bonds by oxidizing the cleaved mixture formed in step (a).

40. A method for the conversion to a polymer of a crosslinked, insoluble, infusible epoxy resin formed by curing
   (i) an epoxy compound having two or more epoxy groups, and
   (ii) a crosslinking agent containing two or more epoxy-reactive groups and further containing a disulfide bond, comprising the steps of
   (a) cleaving the disulfide bonds in said resin by reducing said resin in the presence of a solvent and a reducing agent selected from the group consisting of trialkyl and triaryl phosphine, alkali metal borohydride, alkali metal aluminum hydride and alkali metal trialkyl borohydride, and thereby forming a soluble thiol-containing polymer, and
   (b) reforming the disulfide bonds by oxidizing the cleaved mixture formed in step (a) in the presence of an oxidizing agent selected from iodine, hydrogen peroxide, potassium iodide, air, and oxygen.

41. A method for conversion to a polymer of a crosslinked, insoluble, infusible epoxy resin formed by curing
   (i) an epoxy compound having two or more epoxy groups,
   (ii) a crosslinking agent containing two or more epoxy-reactive groups and further containing a disulfide bond, comprising the steps of:
   (a) cleaving the disulfide bonds in said crosslinked resin by reducing said resin in the presence of a solvent and a reducing agent; and
   (b) modifying the soluble polymer obtained in step (a).

42. A method for conversion to a polymer of a crosslinked, insoluble, infusible epoxy resin formed by curing
   (i) an epoxy compound having two or more epoxy groups, and
   (ii) a crosslinking agent containing two or more epoxy-reactive groups and further containing a disulfide bond, comprising the steps of
   (a) cleaving the disulfide bonds in said crosslinked resin by reducing said resin in the presence of a solvent and a reducing agent selected from the group consisting of trialkyl and triaryl phosphine, alkali metal borohydride, alkali metal aluminum hydride and alkali metal trialkyl borohydride, thereby forming a soluble, thiol-containing polymer, and
   (b) modifying the soluble, thiol-containing polymer obtained in step (a) by
      (i) crosslinking with bis-maleimides of aromatic diamines or with other bifunctional activated vinyl crosslinking agents; or
      (ii) crosslinking with dihalides to form stable thioether linkages; or
      (iii) reacting, in base-catalyzed reactions, with diepoxides or virgin epoxy resins to optimize the properties of the resin and obtain interpenetrating polymer networks (IPN); or
      (iv) grafting of rubber particles which can become covalently bound to the resin and impart enhanced toughness.

43. A method as recited in claim 42 wherein the soluble polymer is modified by crosslinking with bis-maleimides of aromatic diamines or with other bifunctional activated vinyl crosslinking agents.

44. A method as recited in claim 42 wherein the soluble polymer is modified by crosslinking with dihalides to form stable thioether linkages.

45. A method as recited in claim 42 wherein the soluble polymer is modified by reacting, in base-catalyzed reactions, with diepoxides or virgin epoxy resins to optimize the properties of the resin and obtain interpenetrating polymer networks (IPN).

46. A method as recited in claim 42 wherein the soluble polymer is modified by grafting of rubber particles which can become covalently bound to the resin and impart enhanced toughness.

47. An insoluble, infusible epoxy resin containing reversible crosslinks formed by curing
   (i) an epoxy compound having two or more epoxy groups, and
   (ii) a crosslinking agent containing two or more epoxy-reactive groups and further containing a single disulfide bond, under conditions conducive to the formation of a crosslinked polymer.

48. An insoluble, infusible epoxy resin containing reversible crosslinks formed by curing
   (i) an epoxy compound having two or more epoxy groups, and
   (ii) a crosslinking agent containing two or more epoxy-reactive groups and a disulfide bond, said crosslinking agent being selected from compounds having the formula

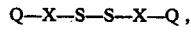

where Q is an epoxy-reactive functional group selected from

—NH₂, —CNHNH₂ and —NCO,
      ‖
      O and X is a divalent aromatic or aliphatic hydrocarbon radical of one to ten carbon atoms, under conditions conducive to the formation of a crosslinked polymer.

49. An epoxy resin as recited in claim 48 wherein said epoxy resin is made from bisphenol A and epichlorohydrin having the formula

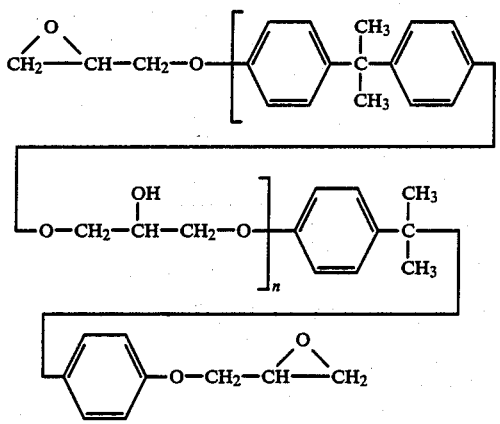

and the crosslinking agent is

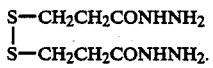

50. An epoxy resin as recited in claim 48 wherein said epoxy resin is made from bisphenol A and epichlorohydrin having the formula

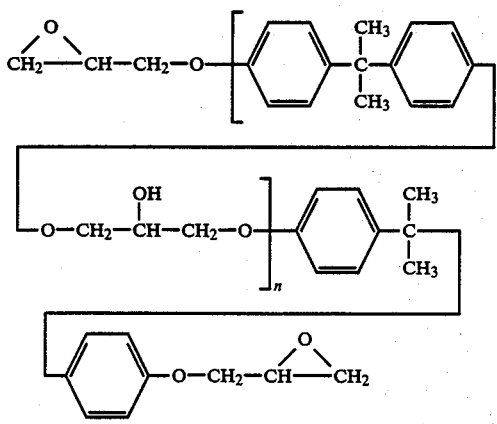

and the crosslinking agent is

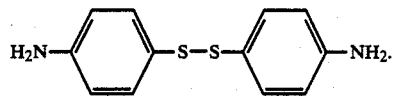

51. A solubilized, thiol-containing polymer obtained from an insoluble, infusible epoxy resin containing reversible crosslinks, said resin having been formed by curing
   (i) an epoxy compound having two or more epoxy groups, and
   (ii) a crosslinking agent containing two or more epoxy-reactive groups and further containing a disulfide bond, under conditions conducive to the formation of a crosslinked resin and said resin having been solubilized by cleaving the disulfide bonds in said resin by reducing said bonds in the presence of a solvent and a reducing agent.

52. A solubilized, thiol-containing epoxy polymer obtained from an insoluble, infusible epoxy resin containing reversible crosslinks, said resin having been formed by curing
   (i) an epoxy compound having two or more epoxy groups, and
   (ii) a crosslinking agent containing two or more epoxy-reactive groups, said crosslinking agent being selected from compounds having the formula

Q—X—S—S—X—Q, where Q is an epoxy-reactive functional group selected from

—NH₂, —CNHNH₂ and —NCO,
      ‖
      O and X is a divalent aromatic or aliphatic hydrocarbon radical of one to ten carbon atoms, under conditions conducive to the formation of a crosslinked resin and said resin having been solubilized by cleaving the disulfide bonds in said resin by reducing said bonds in the presence of a reducing agent selected from the group consisting of trialkyl and triaryl phosphine, alkali metal borohydride, alkali metal aluminum hydride and alkali metal trialkyl borohydride.

53. A soluble polymer having free thiol groups, said polymer having been formed by the reduction of a resin formed from an epoxy compound having two or more epoxy groups and a crosslinking compound containing two or more epoxy reactive groups and further containing a single disulfide bond.

54. A method for the preparation of insoluble, infusible epoxy resins containing reversible crosslinks comprising the steps of:
   (a) forming a reaction mixture of
      (i) an epoxy compound having two or more epoxy groups made from bisphenol A and epichlorohydrin having the formula

[Structural formula of diglycidyl ether of bisphenol A oligomer]

where n is a number from 0.2 to 10, and

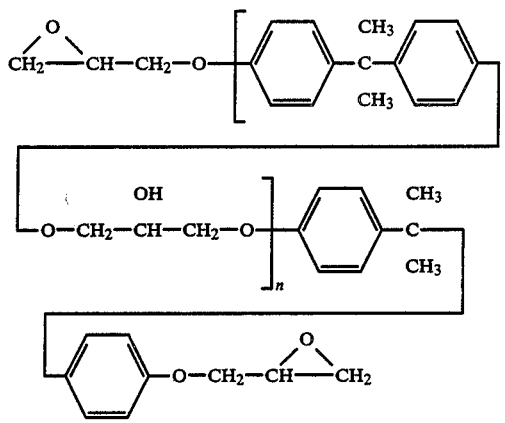

(ii)

(b) curing said reaction mixture at a temperature of 70° to 180° C. under conditions conducive to the formation of a crosslinked resin.

55. A method for the preparation of insoluble, infusible epoxy resins containing reversible crosslinks comprising the steps of:

(a) forming a reaction mixture of
(i) an epoxy compound having two or more epoxy groups made from bisphenol A and epichlorohydrin having the formula

[Structural formula of diglycidyl ether of bisphenol A oligomer]

where n is a number from 0.2 to 10, and

S—CH$_2$CH$_2$CONHNH$_2$
|
S—CH$_2$CH$_2$CONHNH$_2$, and (ii)

(b) curing said reaction mixture at a temperature of 70° to 180° C. under conditions conducive to the formation of a crosslinked resin.

56. A method for the preparation of insoluble, infusible epoxy resins containing reversible crosslinks comprising the steps of:

(a) forming a reaction mixture of
(i) an epoxy compound having two or more epoxy groups made from bisphenol A and epichlorohydrin having the formula

[Structural formula of diglycidyl ether of bisphenol A oligomer]

where n is a number from 0.2 to 10, and

[Structure: H$_2$NHNOC-phenyl-S-S-phenyl-CONHNH$_2$]   (ii)

, and (b) curing said reaction mixture at a temperature of 70° to 180° C. under conditions conducive to the formation of a crosslinked resin.

* * * * *